(12) United States Patent
Kaede

(10) Patent No.: US 12,111,970 B2
(45) Date of Patent: Oct. 8, 2024

(54) INFORMATION PROCESSING DEVICE AND NON-TRANSITORY COMPUTER READABLE MEDIUM FOR CONTROLLING FLOATING IMAGES AND DETECTING GESTURES

(71) Applicant: FUJIFILM BUSINESS INNOVATION CORP., Tokyo (JP)

(72) Inventor: Ikumi Kaede, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 831 days.

(21) Appl. No.: 16/891,250

(22) Filed: Jun. 3, 2020

(65) Prior Publication Data
US 2021/0200321 A1 Jul. 1, 2021

(30) Foreign Application Priority Data
Dec. 25, 2019 (JP) .................. 2019-235296

(51) Int. Cl.
G06F 3/01 (2006.01)
G02B 30/56 (2020.01)
G03H 1/00 (2006.01)

(52) U.S. Cl.
CPC ............ *G06F 3/017* (2013.01); *G02B 30/56* (2020.01); *G03H 1/0005* (2013.01); *G03H 2001/0061* (2013.01)

(58) Field of Classification Search
CPC .. G02B 30/56; G02B 27/0093; G03H 1/0005; G03H 2001/0061; G06F 3/017
See application file for complete search history.

(56) References Cited

U.S. PATENT DOCUMENTS

2016/0026244 A1 * 1/2016 Ogawa ................. H04N 9/3194
345/156

FOREIGN PATENT DOCUMENTS

| JP | 2012033104 A | * | 2/2012 |
| JP | 2015-35103 A | | 2/2015 |
| JP | 2016-24752 A | | 2/2016 |

OTHER PUBLICATIONS

Aug. 1, 2023 Office Action issued in Japanese Patent Application No. 2019-235296.

* cited by examiner

*Primary Examiner* — Yaron Cohen
(74) *Attorney, Agent, or Firm* — Oliff PLC

(57) ABSTRACT

An information processing device includes a processor configured to perform a first process in response to detection of a first movement of a tangible object in a real world, the first movement comprising a first pass-through of a first region from a first space to a second space, the first region corresponding to a first image presented in midair to a user, the first space being a space on one side of the first region, the second space being a space on an opposite side of the first region, and perform a second process in response to detection of a second movement of the object, the second movement comprising an entrance to the first region from the first space but not comprising an exit to the second space from the first region.

17 Claims, 30 Drawing Sheets

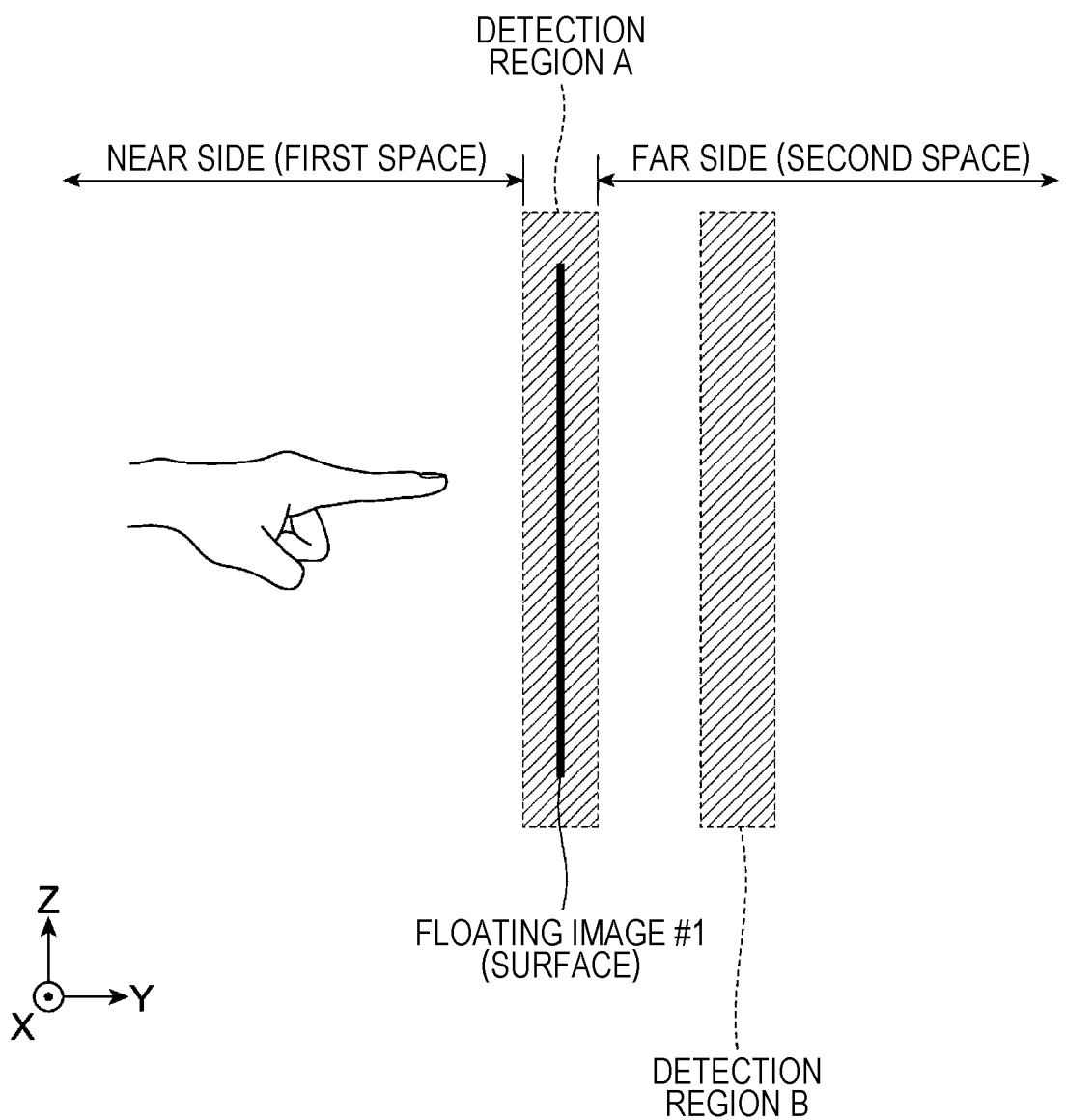

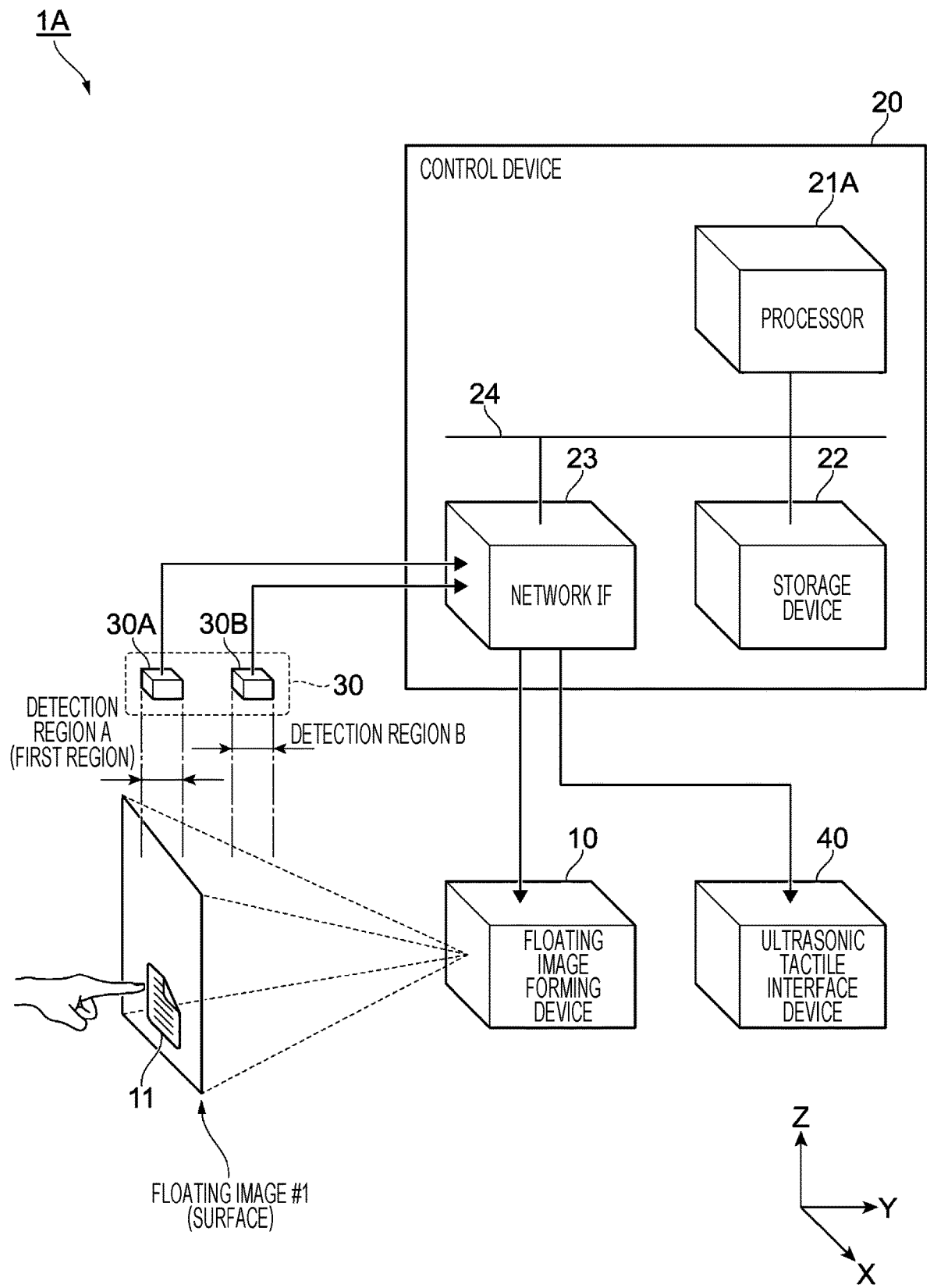

FIG. 21
- CONTENT OF IMAGE CORRESPONDING TO SURFACE ON FRONT SIDE: DOCUMENT A
- CONTENT OF IMAGE CORRESPONDING TO SURFACE ON TOP SIDE: EMAIL TO MYSELF
- CONTENT OF IMAGE CORRESPONDING TO SURFACE ON RIGHT SIDE: PRINT
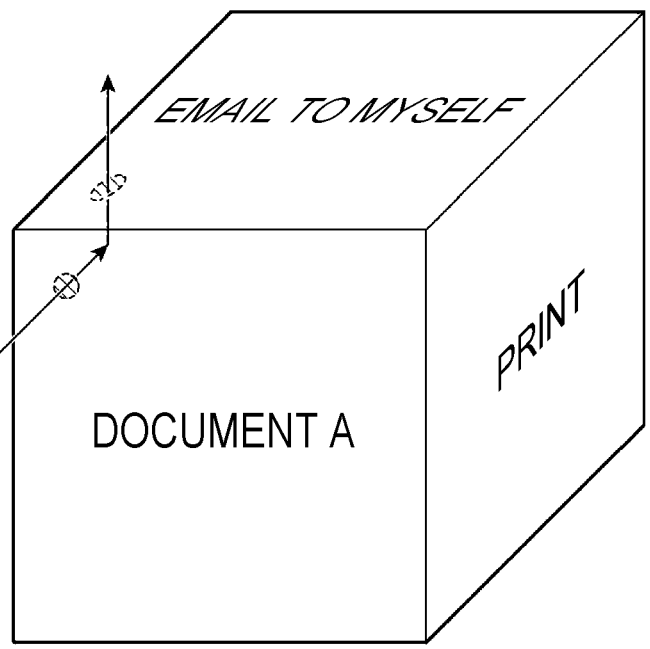
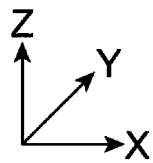 : POSITION WHERE FINGERTIP PASSES THROUGH FIG. 22
- CONTENT OF IMAGE CORRESPONDING TO SURFACE ON FRONT SIDE: DOCUMENT A
- CONTENT OF IMAGE CORRESPONDING TO SURFACE ON TOP SIDE: EMAIL TO MYSELF
- CONTENT OF IMAGE CORRESPONDING TO SURFACE ON RIGHT SIDE: PRINT
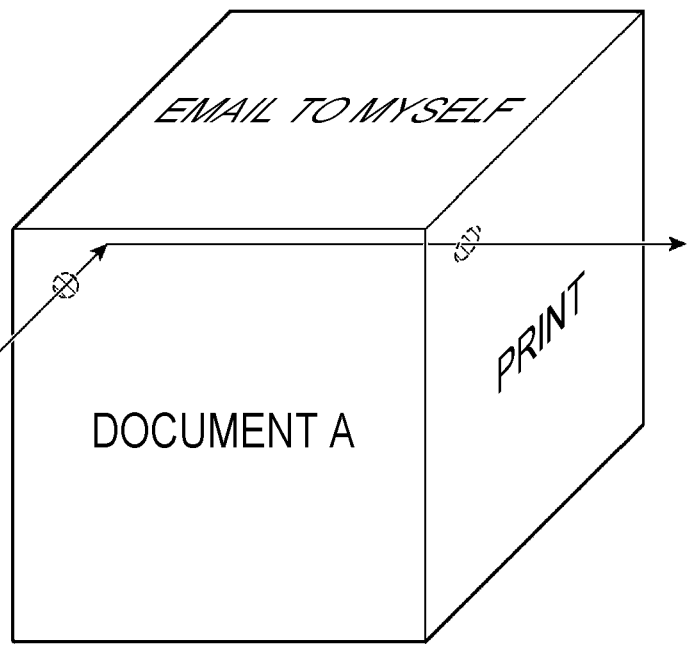
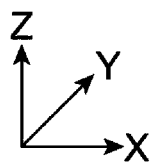 : POSITION WHERE FINGERTIP PASSES THROUGH

- CONTENT OF IMAGE CORRESPONDING TO SURFACE ON FRONT SIDE: CREATE PDF FILE
- CONTENT OF IMAGE CORRESPONDING TO SURFACE ON TOP SIDE: SEND EMAIL
- CONTENT OF IMAGE CORRESPONDING TO SURFACE ON RIGHT SIDE: SELECT STORAGE LOCATION

: POSITION WHERE FINGERTIP PASSES THROUGH

FIG. 24
- CONTENT OF IMAGE CORRESPONDING TO SURFACE ON FRONT SIDE: CREATE PDF FILE
- CONTENT OF IMAGE CORRESPONDING TO SURFACE ON TOP SIDE: SEND EMAIL
- CONTENT OF IMAGE CORRESPONDING TO SURFACE ON RIGHT SIDE: SELECT STORAGE LOCATION
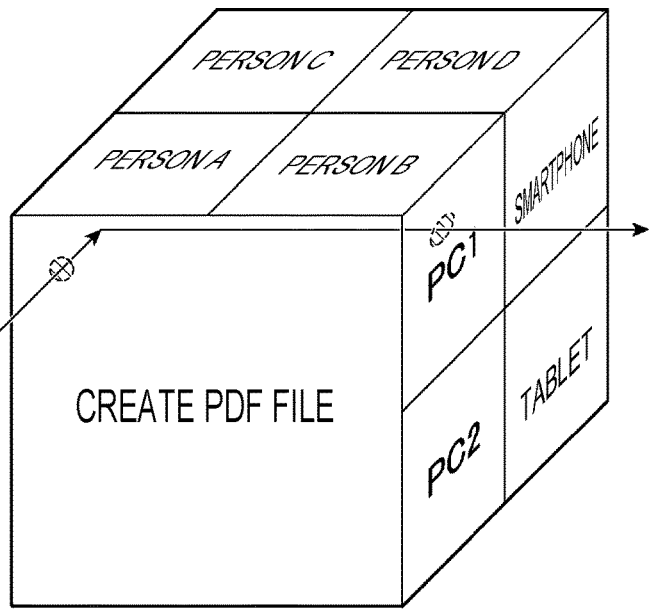
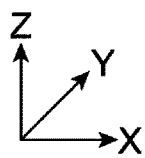
: POSITION WHERE FINGERTIP PASSES THROUGH

FLOATING IMAGE #2

FLOATING IMAGE #1

FIG. 27
- CONTENT OF IMAGE CORRESPONDING TO SURFACE ON FRONT SIDE: SELECT STORAGE LOCATION
- CONTENT OF IMAGE CORRESPONDING TO SURFACE ON TOP SIDE: SEND EMAIL
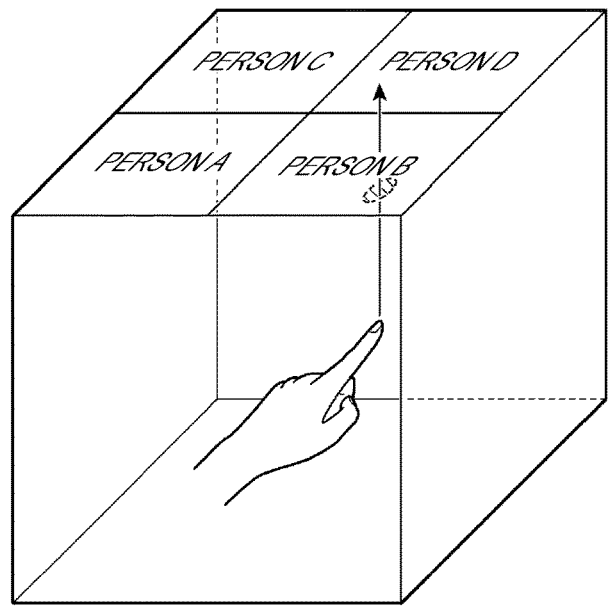
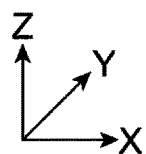

INFORMATION PROCESSING DEVICE AND NON-TRANSITORY COMPUTER READABLE MEDIUM FOR CONTROLLING FLOATING IMAGES AND DETECTING GESTURES

CROSS-REFERENCE TO RELATED APPLICATIONS

This application is based on and claims priority under 35 USC 119 from Japanese Patent Application No. 2019-235296 filed Dec. 25, 2019.

BACKGROUND

(i) Technical Field

The present disclosure relates to an information processing device and a non-transitory computer readable medium.

(ii) Related Art

Currently, there are technologies that use gestures for input. For example, there is a technology that analyzes an image taken when a user performs a gesture with respect to an image displayed on a monitor or other display device, and specifies the content of an operation. There is also a technology that specifies the content of an operation according to the distance between an object that a user uses to direct input and the display surface of a display device. For example, see Japanese Unexamined Patent Application Publication No. 2015-35103.

SUMMARY

Currently, technologies that present an image floating in midair have been proposed, and some of these technologies are being applied to interfaces for input. However, the methods of operation are similar to the methods of operation with respect to a physical display.

Aspects of non-limiting embodiments of the present disclosure relate to diversifying the variety of inputtable operations compared to the case of operating a physical display.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to perform a first process in response to detection of a first movement of a tangible object in a real world, the first movement comprising a first pass-through of a first region from a first space to a second space, the first region corresponding to a first image presented in midair to a user, the first space being a space on one side of the first region, the second space being a space on an opposite side of the first region, and perform a second process in response to detection of a second movement of the object, the second movement comprising an entrance to the first region from the first space but not comprising an exit to the second space from the first region.

BRIEF DESCRIPTION OF THE DRAWINGS

Exemplary embodiments of the present disclosure will be described in detail based on the following figures, wherein:

FIG. 2 is a diagram explaining a positional relationship between a floating image #1 as an example of a first floating image and detection regions;

FIGS. 3A to 3C are diagrams explaining the relationship between a fingertip and a detection region A in a case where the target of detection is a fingertip, in which FIG. 3A illustrates a state in which the fingertip is on a near side of the detection region A, FIG. 3B illustrates a state in which the fingertip is in the detection region A, and FIG. 3C illustrates a state in which the fingertip is on a far side of the detection region A;

FIG. 5 is a diagram illustrating an exemplary configuration of an information processing system used in Exemplary Embodiment 2;

FIGS. 6A to 6C are diagrams explaining an example of feedback regarding the reception of a process in the exemplary embodiment, in which FIG. 6A illustrates feedback in a state in which the fingertip is on the near side of the detection region A corresponding to an icon, FIG. 6B illustrates feedback in a state in which the fingertip is in the detection region A corresponding to an icon, and FIG. 6C illustrates feedback in a state in which the fingertip is on the far side of the detection region A corresponding to an icon;

FIGS. 10A and 10B are diagrams explaining exemplary processing operations executed in a case where the fingertip passes through the detection region A, in which FIG. 10A illustrates a state in which the fingertip has passed through the detection region A, and FIG. 10B illustrates the position of a floating image #2b as an example of a second floating image presented after the detection of the passing through;

FIGS. 11A and 11B are diagrams explaining exemplary processing operations executed in a case where the fingertip is in the detection region A, in which FIG. 11A illustrates a state in which the fingertip is in the detection region A, and FIG. 11B illustrates the position of a floating image #2a as an example of a second floating image presented after the detection of the passing through;

FIGS. 15A and 15B are diagrams explaining an example of a gesture in which a fingertip is made to pass through the detection region A from the near side of the detection region A to the far side of the detection region A, and then return back to the near side from the far side by passing through the detection region A again, in which FIG. 15A illustrates a sub-region used to direct a process in a case where the fingertip returns to the near side within t seconds from the timing of passing through the detection region A when moving from the near side to the far side, and FIG. 15B illustrates a sub-region used to direct a process in a case where the fingertip returns to the near side after t seconds or more elapse from the timing of passing through the detection region A when moving from the near side to the far side;

FIGS. 17A and 17B are diagrams explaining an example of utilizing the motion of a fingertip that has passed through to the far side of the detection region A passing through again to the near side to direct a process, in which FIG. 17A illustrates a sub-region used to direct a process in a case of returning to the near side within t seconds from the detection of the passing through, and FIG. 17B illustrates a sub-region used to direct a process in the case of returning to the near side after t seconds or more elapse from the detection of the passing through;

FIGS. 19A to 19C are diagrams explaining a positional relationship between each surface of the floating solid image in FIG. 18 and detection regions, in which FIG. 19A illustrates information presented on each surface of a floating image #1, FIG. 19B illustrates an example of setting detection regions in a case of viewing the floating solid image from the surface on the right side from the user's point of view, and FIG. 19C illustrates an example of setting detection regions in a case where the user views the front surface of the floating solid image;

FIG. 21 is a diagram explaining a specific example of directing a process according to Exemplary Embodiment 4;

FIG. 22 is a diagram explaining another specific example of directing a process according to Exemplary Embodiment 4;

FIG. 24 is a diagram explaining another specific example of directing a process according to Exemplary Embodiment 4;

FIG. 27 is a diagram explaining the motion of a fingertip after a file is selected;

DETAILED DESCRIPTION

Hereinafter, exemplary embodiments of the disclosure will be described with reference to the drawings.

Exemplary Embodiment 1

<System Configuration>

Figure 1:
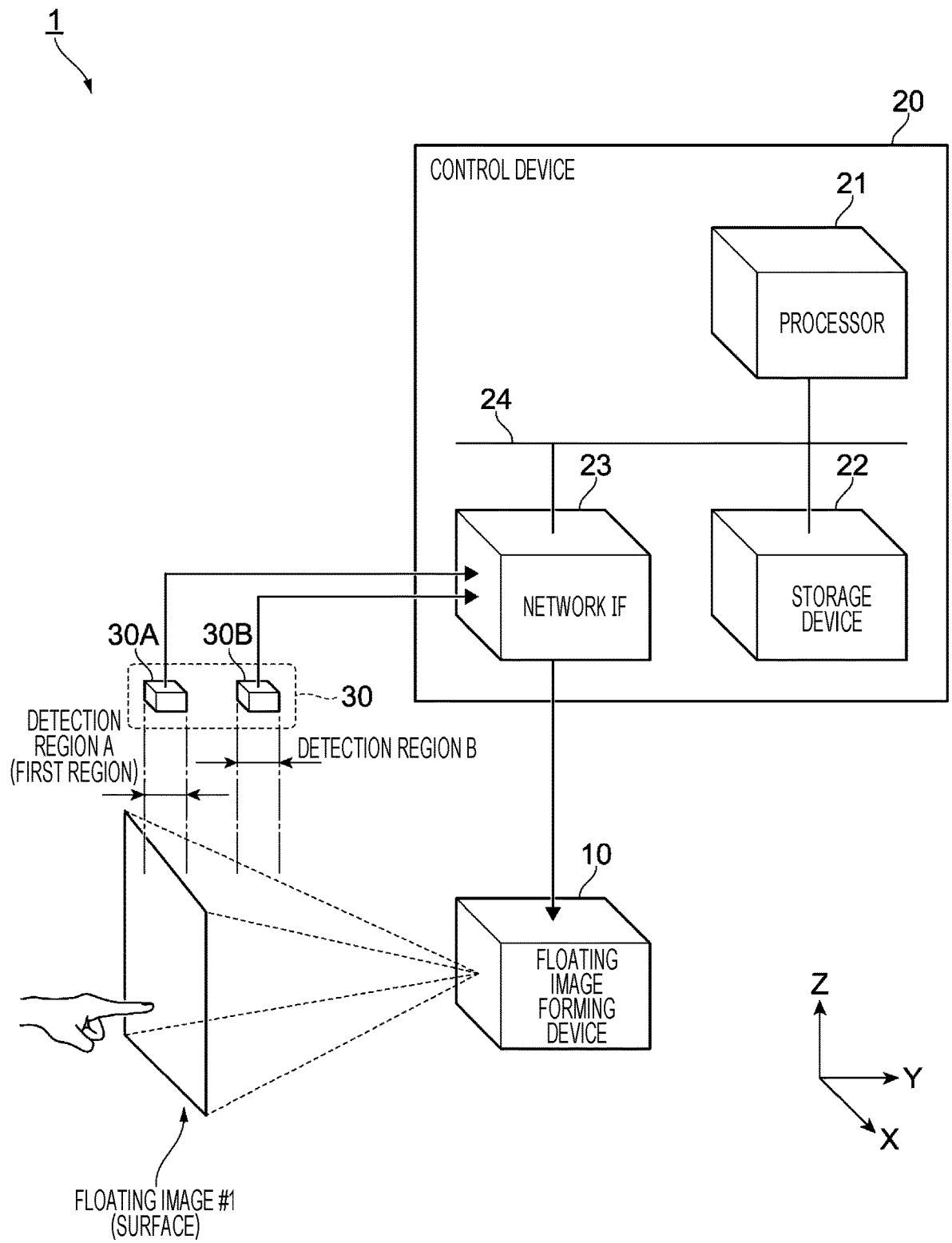
FIG. 1 is a diagram illustrating an exemplary configuration of an information processing system used in Exemplary Embodiment 1.

FIG. 1 is a diagram illustrating an exemplary configuration of an information processing system 1 used in Exemplary Embodiment 1.

The information processing system 1 illustrated in FIG. 1 includes a floating image forming device 10, a control device 20 that controls the floating image forming device 10, and a sensor 30 that detects the position of an object, such as a hand, a finger, a pen, or an electronic device, in the space where the floating image is being displayed.

In the following, an image presented floating in midair by the floating image forming device 10 is called the "first floating image", and is designated the floating image #1.

The sensor 30 may also detect a specific part of the object rather than the whole object. In one example, the sensor 30 may detect the position of the palm of the hand. In another example, the sensor 30 may detect the position of the tip of a finger or the tip of a pen-type device. In another example, the sensor 30 may detect the position of a device worn on the fingertip or a specific component embedded in a pen-type device. In the following description, an example in which the sensor 30 detects the position of a fingertip will be described.

The floating image #1 is presented to float in midair, and the object is capable of passing through the floating image #1.

Note that the floating image #1 according to the exemplary embodiment is not an image projected onto a screen that exists in real space. Furthermore, the floating image according to the exemplary embodiment is not an image displayed by an afterimage phenomenon produced by causing an array of light emitters to move through real space at high speeds.

Examples of the floating image include but are not limited to graphics, text, and combinations of graphics and text. Also, the floating image is not limited in size or shape. The floating image may be a planar image or an image of a solid shape. Examples of a planar image include triangular shapes, rectangular shapes, other polygonal shapes, and more complex shapes (such as star shapes, heart shapes, and silhouettes of persons, things, and animals). Examples of an images of a solid shape include spherical shapes, columnar shapes, conical shapes, cubical shapes, triangular pyramidal shapes, other pyramidal shapes, prismatic shapes, regular polyhedron shapes, and combinations of the above, as well as more complex three-dimensional images such as the human body, vehicles, and rooms.

In the case of the exemplary embodiment, the floating image is used as a guide for directing a process by having the user move the object through the space where the floating image is presented. Also, the floating image is not limited to a still image, and may also be a moving image.

The floating image forming device 10 is a device that directly presents the floating image in midair. Various methods of directly forming the floating image #1 in midair have already been proposed, and some have been put into practical use. For example, such methods of forming the floating image include a method of using a half-mirror, a method of using a beam splitter, a method of using a micromirror array, a method of using a microlens array, a method of using a parallax barrier, and a method of using plasma emission. The method by which the floating image forming device 10 presents the floating image in midair may be any of the methods listed here or some other method that becomes usable in the future.

The control device 20 includes a processor 21 that executes searching and other processes through the execution of a program, a storage device 22 that stores programs and various data, a network interface (IF) 23 that communicates with external equipment, and a bus or other signal line 24 that connects the above components. The control device 20 may be what is referred to as a computer, or may be a server on the Internet. The control device 20 is one example of an information processing device.

The processor 21 includes a CPU, for example. The storage device 22 includes read-only memory (ROM) storing information such as a basic input/output system (BIOS), random access memory (RAM) used as a work area, and a hard disk drive storing information such as a basic program and application programs, for example.

However, this does not preclude cases in which ROM and RAM are included as part of the processor 21. The processor 21 and the storage device 22 form a computer.

The sensor 30 is a device that detects an object cutting across a detection region set in association with the position where the floating image #1 is presented.

In the case of the exemplary embodiment, the sensor 30 uses an infrared sensor. For this reason, detection regions A and B of the infrared sensor are not perceived by a person.

The detection region A of a sensor 30A is provided in correspondence with the floating image #1 presented in midair by the floating image forming device 10. In the exemplary embodiment, the detection region A is set to include the region where the floating image is displayed and the periphery of the region. Specifically, in the case where the floating image #1 is treated as a reference surface, the detection region A is set as a region substantially parallel to the reference surface and having a predetermined width in the normal direction of the reference surface. More specifically, the detection region A is set as a region having a width from several millimeters to approximately one centimeter for example in the direction of each of the space on the near side and the space on the far side of the floating image #1 from the perspective of the user. Note that it is not necessary for the detection region A to be centered on the floating image in the thickness direction. The detection region A herein is one example of a first region.

Note that in the exemplary embodiment, the detection region A is set to include the region where the floating image #1 is presented and the periphery of the region, but the detection region A may also be set not to include the region where the floating image #1 is presented. For example, the detection region A may also be set approximately five millimeters away on the near side or the far side of the region where the floating image #1 is presented. Also, in the exemplary embodiment, the detection region A is given a thickness, but the detection region A does not have to have a thickness. The detection region A may also be substantially the same as the region where the floating image #1 is presented.

The sensor 30A does not have to be a single infrared sensor, and may also be multiple infrared sensors. Note that if multiple infrared sensors are used, it is also possible to use the principle of triangulation to detect the position where an object intrudes into the floating image #1.

In the case of the exemplary embodiment, a detection region B of a sensor 30B is set in the space on the far side of the floating image #1. The sensor 30B is set to detect that an object has passed through the floating image #1. The detection region of the sensor 30B is set substantially parallel to the detection region of the sensor 30A.

The sensor 30B likewise does not have to be a single infrared sensor, and may also be multiple infrared sensors.

In the exemplary embodiment, infrared sensors are used as the sensors 30A and 30B, but imaging sensors may also be used. For example, if an image is taken from a side view of the floating image #1, it is possible to detect states such as whether the fingertip is overlapping with the floating image #1 or has passed through. Also, by taking an image of the region where the floating image #1 is presented with an imaging sensor, it is also possible to detect the position of a region to treat as a process target within the detection region A.

FIG. 2 is a diagram explaining a positional relationship between the floating image #1 and the detection regions A and B.

In the exemplary embodiment, the side on which the user is present with respect to the detection region A set with reference to the floating image #1 is referred to as the space on the near side of the detection region A, while the side on which the user is not present is referred to as the space on the far side of the detection region A.

The space on the near side is one example of a first space, and the space on the far side is one example of a second space. The space on the near side and the space on the far side are positioned opposite each other with the detection region A interposed in between.

Note that the detection region B described above is set substantially parallel to the detection region A in the space on the far side.

In the example of FIG. 2, a gap is provided between the detection region B and the detection region A, but the gap may also be omitted. In either case, in the example of FIG. 2, the gap between the detection region A and the detection region B is exaggerated for clarity.

Figure 3A:
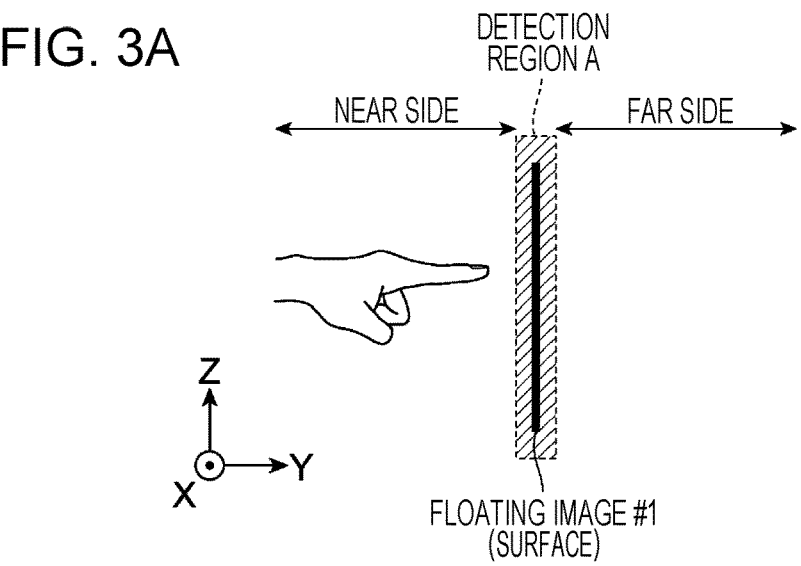
Figure 3B:
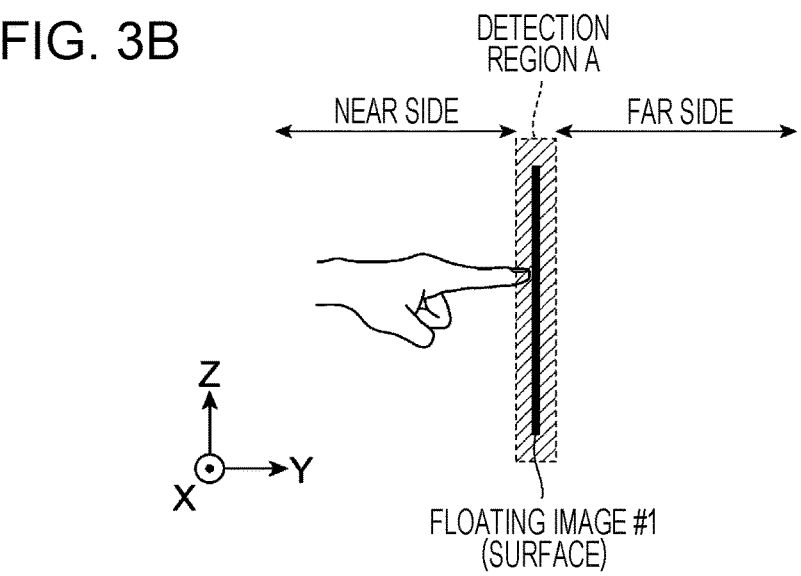
Figure 3C:
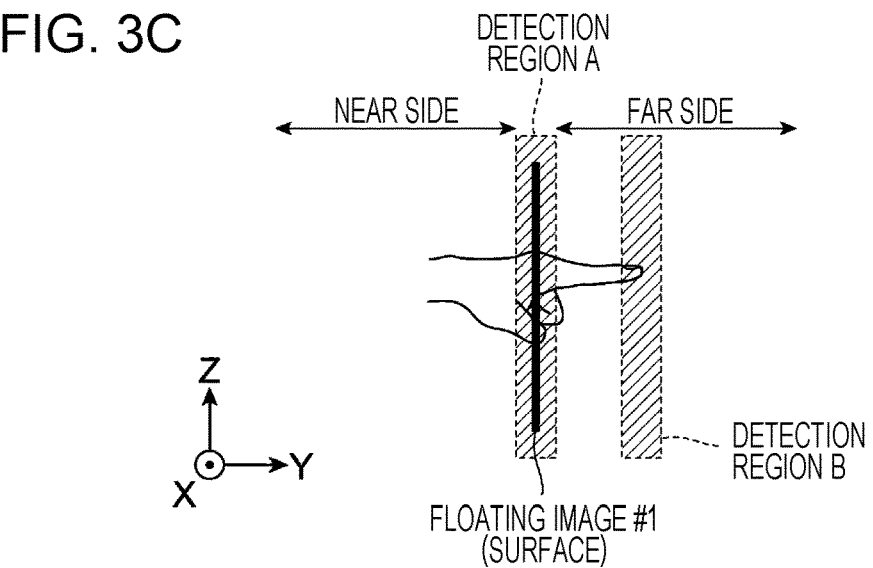

FIGS. 3A to 3C are diagrams explaining the relationship between a fingertip and the detection region A in a case where the target of detection is a fingertip, in which FIG. 3A illustrates a state in which the fingertip is on the near side of the detection region A, FIG. 3B illustrates a state in which the fingertip is in the detection region A, and FIG. 3C illustrates a state in which the fingertip is on the far side of the detection region A.

As an example, in a state in which the object is detected in neither of the detection region A and the detection region B, the position of the fingertip may be treated as being in the state of FIG. 3A. Also, when the object is detected in the detection region A but not in the detection region B, the position of the fingertip may be treated as being in the state of FIG. 3B. Also, in a state in which the object is detected in both the detection region A and the detection region B, the position of the fingertip may be treated as being in the state of FIG. 3C.

Herein, in the case where the state of the user's fingertip changes from FIG. 3A to 3B and additionally from FIG. 3B to FIG. 3A within a fixed amount of time, it is conceivable that the user intends to cause the fingertip to touch the surface of the floating image #1 presented in correspondence with the detection region A. In the case where the state of the user's fingertip changes from FIG. 3A to 3B and additionally from FIG. 3B to FIG. 3C within a fixed amount of time, it is conceivable that the user intends to cause the fingertip to pass through the surface of the floating image #1 presented in correspondence with the detection region A.

Figure 4:
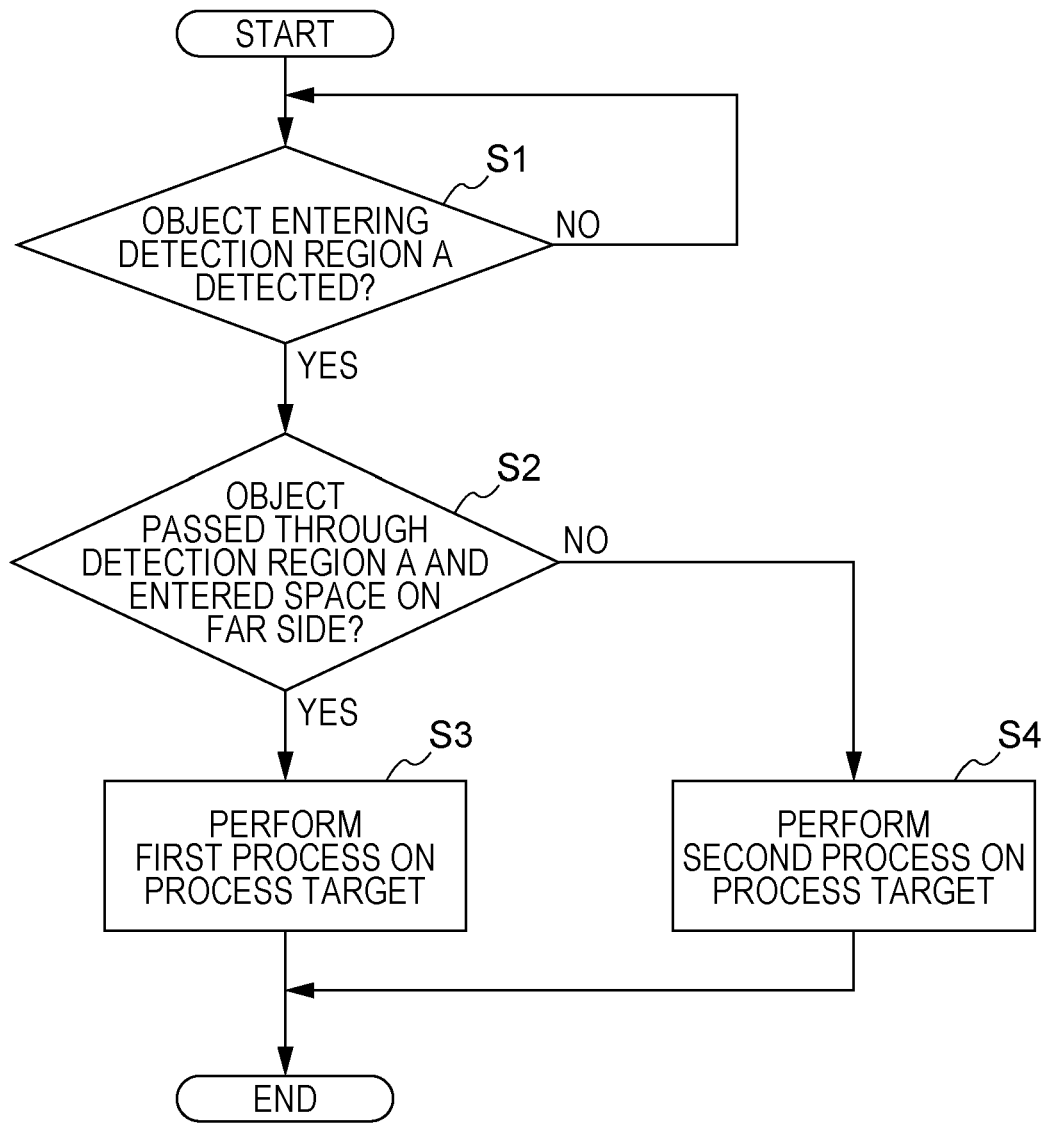
FIG. 4 is a flowchart explaining exemplary processing operations by a processor used in Exemplary Embodiment 1.

FIG. 4 is a flowchart explaining exemplary processing operations by the processor 21 (see FIG. 1) used in Exemplary Embodiment 1. The symbol "S" in the diagram means "step".

The processing operations illustrated in FIG. 4 are an example in which the entire floating image #1 is treated as the detection surface.

The processor 21 in the exemplary embodiment determines whether or not the sensor 30 (see FIG. 1) has detected the object entering the detection region A from the space on the near side (step 1).

The processor 21 repeats the determination while a negative result is obtained in step 1.

On the other hand, if a positive result is obtained in step 1, the processor 21 determines whether or not the object entering the detection region A from the space on the near side has passed through the detection region A and entered the space on the far side (step 2).

In the case where a positive result is obtained in step 2, the processor 21 performs a first process on a process target (step 3). On the other hand, in the case where a negative result is obtained in step 2, the processor 21 performs a second process on a process target (step 4). For example, putting the process target into a first state may be treated as the first process, and putting the process target into a second state may be treated as the second process.

One example of the process target is a terminal. Herein, a terminal may refer to the control device 20 (see FIG. 1) or to an information processing device not illustrated that is capable of communicating with the processor 21. The information processing device not illustrated may be a device such as a television, a video player, audio equipment, electronic cookware, an air conditioner, lighting equipment, a PC, a smartphone, or a tablet, for example, but is not limited to the above. The process target of the first process and the process target of the second process may be the same or different.

In the case where a terminal treated as the process target of the first process and a terminal treated as the process target of the second process are the same, it may be beneficial to present an image indicating the terminal treated as the process target of the first process and the second process as the floating image #1 corresponding to the detection region A. Specifically, when a process of putting the personal computer (PC) of a user named Eriko into sleep mode is assigned to the first process, and a process of restarting Eriko's PC is assigned to the second process, it may be beneficial to cause a rectangle with the text "Eriko's PC" or a rectangle with an avatar of Eriko and an icon of the PC to be displayed as the floating image #1 corresponding to the detection region A, for example. In other words, if a user moves his or her finger to touch the surface of the floating image representing Eriko's PC, by changing the state of the user's fingertip from FIG. 3A to FIG. 3B and additionally from FIG. 3B to FIG. 3A within a fixed amount of time, Eriko's PC is put into sleep mode. On the other hand, if a user moves his or her finger to pass through the surface of the floating image #1 representing Eriko's PC, by changing the state of the user's fingertip from FIG. 3A to FIG. 3B and additionally from FIG. 3B to FIG. 3C within a fixed amount of time, Eriko's PC is restarted.

If this flow of operations is considered from the user's perspective, the floating image #1 looks like a "passable button", and appears as though it is possible to give instructions for different processes using the same button depending on whether a fingertip of the tip of a stylus is made to lightly contact the button (referred to as a "touch" for convenience) or is made to move deeply through the button (referred to as a "deep touch" for convenience). Using the floating image #1 as a guide, the user is able to direct the execution of the first process by moving his or her finger to change the state of the fingertip from FIG. 3A to FIG. 3B and additionally from FIG. 3B to FIG. 3A within a fixed amount of time, and is also able to direct the execution of the second process by moving his or her finger to change the state of the fingertip from FIG. 3A to 3B and additionally from FIG. 3B to FIG. 3C within a fixed amount of time.

The process target does not have to be a terminal, and may also be a file such as a document, an image, or music. These files may be saved in the control device 20 (see FIG. 1) or in an information processing device not illustrated that is capable of communicating with the processor 21. The process target of the first process and the process target of the second process may be the same or different.

In the case where a file treated as the process target of the first process and a file treated as the process target of the second process are the same, it may be beneficial to present an image indicating the file treated as the process target of the first process and the second process as the floating image #1 corresponding to the detection region A. Specifically, when a process of selecting a document file named "Patent_Law.docx" is assigned to the first process, and a process of opening the document file named "Patent_Law.docx" is assigned to the second process, it may be beneficial to cause a rectangle with the file name "Patent_Law.docx" or a preview of "Patent_Law.docx" to be displayed as the floating image #1 corresponding to the detection region A, for example. In other words, if the user moves his or her finger to touch the surface of the floating image #1 representing "Patent_Law.docx", "Patent_Law.docx" is selected by changing the state of the user's fingertip from FIG. 3A to FIG. 3B and then from FIG. 3B to FIG. 3A within a fixed amount of time. To indicate that the file has been selected, the color of the floating image #1 representing "Patent_Law.docx" is changed, for example. On the other hand, if the user moves his or her finger to pass through the surface of the floating image #1 representing "Patent_Law.docx", "Patent_Law.docx" is opened by changing the state of the user's fingertip from FIG. 3A to FIG. 3B and then from FIG. 3B to FIG. 3C within a fixed amount of time. Note that the contents of the opened "Patent_Law.docx" may be presented as a floating image by the floating image forming device 10, or may be displayed on a display (not illustrated) capable of communicating with the processor 21.

In the case of receiving an instruction to execute the first process or the second process, the floating image #1 may be removed from midair or allowed to remain in midair. In the case of allowing the floating image #1 to remain in midair, the appearance of the floating image #1 may also be changed in accordance with receiving the process instruction. For example, the color, transparency, or size may be changed, or text or an icon indicating that the process has been executed may be added to the floating image. Also, the appearance of the floating image #1 may be changed to a different appearance between the case of receiving an instruction to execute the first process and the case of receiving an instruction to execute the second process.

The processes assigned to the first process and the second process in the exemplary embodiment are merely an example, and the assignment of the first process and the second process may be reversed, or processes other than the processes described here may be assigned. For example, a process of printing "Patent_Law.docx" from a printer set as default may be assigned to the first process, and a process of presenting candidates of the printer to use to print "Patent_Law.docx" may be assigned to the second process. The candidates of the printer may be presented on the floating image #1 indicating "Patent_Law.docx", presented in a new floating image, or displayed on a display (not illustrated) capable of communicating with the processor 21. In the exemplary embodiment, the new floating image is referred to as the second floating image, and is distinct from the first floating image. The second floating image is designated the floating image #2.

Note that multiple floating images #1 may also be presented in midair at the same time. In the case where a floating image #1a and a floating image #1b are presented at the same time, a detection region corresponding to the floating image #1a and a detection region corresponding to the floating image #1b are each provided.

Exemplary Embodiment 2

<System Configuration>

FIG. 5 is a diagram illustrating an exemplary configuration of an information processing system 1A used in Exemplary Embodiment 2. In FIG. 5, portions that correspond to FIG. 1 are denoted with the same signs.

In the information processing system 1A illustrated in FIG. 5, an ultrasonic tactile interface device 40 that provides a user with feedback regarding the reception of a process instruction is added.

The ultrasonic tactile interface device 40 includes an ultrasonic transducer array containing a large number of ultrasonic transducers arranged in a grid. The ultrasonic tactile interface device 40 according to the exemplary embodiment generates ultrasonic waves to focus on a specific region of a floating image. However, the ultrasonic transducer array may be made to operate only in the case where the sensor 30 detects the insertion of a fingertip into the specific region.

When the ultrasonic transducer array operates, pressure referred to as acoustic radiation pressure occurs in the specific region. For this reason, when the fingertip is positioned at the position where the acoustic radiation pressure is occurring, a tactile stimulus like pressing a surface is generated.

An image of an icon 11 is disposed in a portion of the floating image illustrated in FIG. 5. In the example of FIG. 5, the fingertip is approaching the icon 11, but the user does not know how a processor 21A detects the process instruction given by the user him- or herself. The region corresponding to the icon 11 within the detection region A is an example of a sub-region in the detection region A.

In the case of the exemplary embodiment, the processor 21A detects the position of the fingertip with respect to the region corresponding to the icon 11 rather than the entire detection region A. To reliably detect the region corresponding to the icon 11, it is desirable to dispose a sensor 30 not illustrated that treats the range of height where the icon 11 is presented as the detection region. In this case, the region where the detection region A of the sensor 30 illustrated in FIG. 5 and the detection region of the sensor 30 not illustrated intersect is set as the sub-region.

Figure 6A:
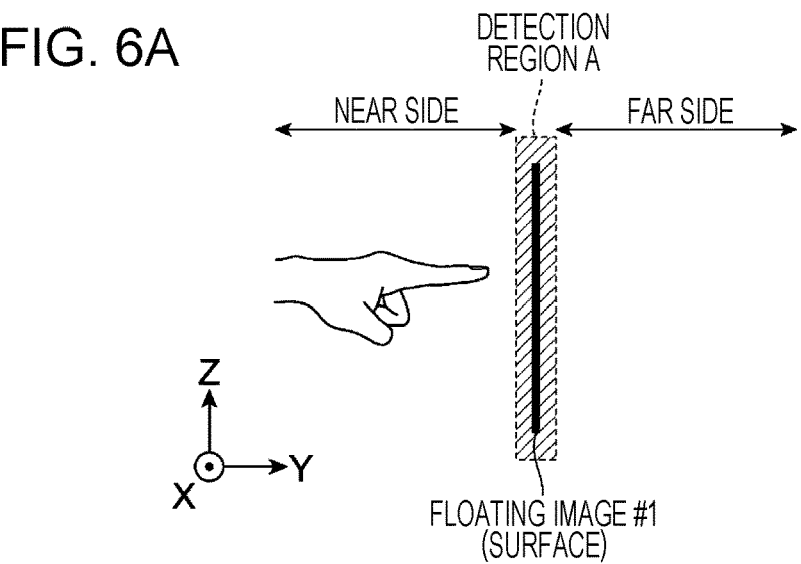
Figure 6B:
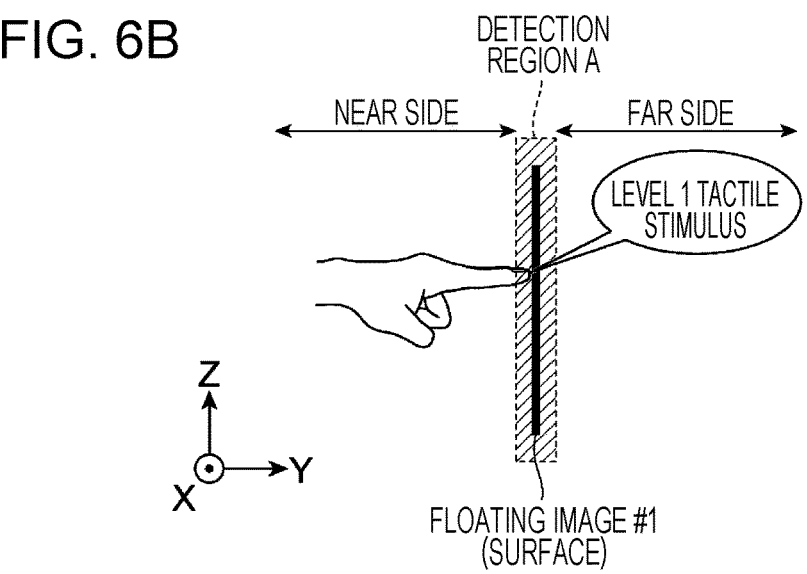
Figure 6C:
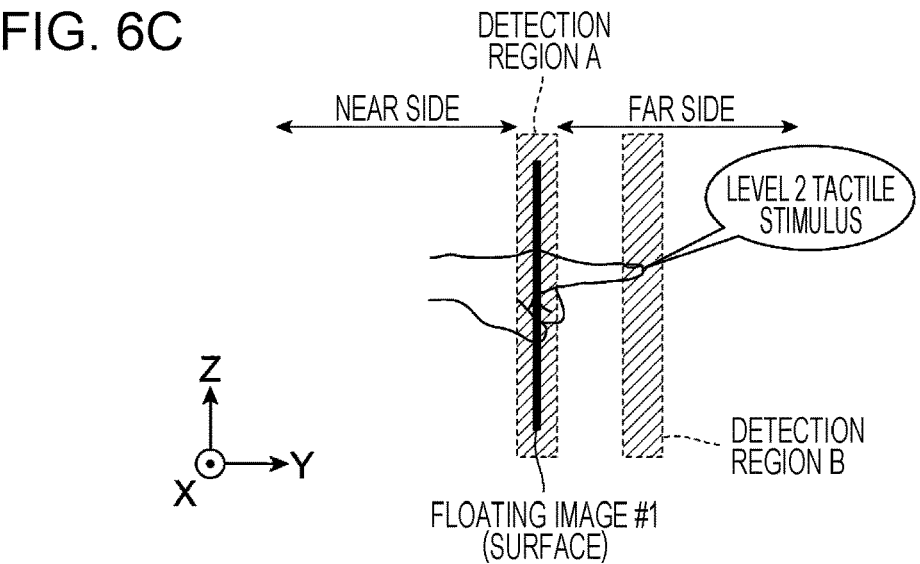

FIGS. 6A to 6C are diagrams explaining an example of feedback regarding the reception of a process instruction in the exemplary embodiment, in which FIG. 6A illustrates feedback in a state in which the fingertip is on the near side of the detection region A corresponding to the icon 11 (see FIG. 5), FIG. 6B illustrates feedback in a state in which the fingertip is in the detection region A corresponding to the icon 11, and FIG. 6C illustrates feedback in a state in which the fingertip is on the far side of the detection region A corresponding to the icon 11.

As an example, a level 1 tactile stimulus is generated in the fingertip in the state in which the fingertip is in the detection region A corresponding to the icon 11. A level 2 tactile stimulus is generated in the fingertip in the state in which the fingertip is on the far side of the detection region A corresponding to the icon 11. In the case of the exemplary embodiment, the level 2 tactile stimulus is greater than level 1. Note that the difference between level 1 and level 2 is set to be perceived as a difference in the strength of the tactile stimulus by the user who inserts his or her fingertip into the floating image #1.

However, the generation of the tactile stimulus by acoustic radiation pressure may be conditional on the fingertip exiting a specific detection region rather than being conditional on the fingertip entering a specific detection region.

Also, a difference in the number of tactile stimuli may be used instead of a difference in strength between the levels. For example, in the state in which the fingertip remains in the detection region A, the level 1 tactile stimulus may be generated in the fingertip once per second for example, and in the state in which the fingertip passes through the detection region A and reaches the detection region B, the level 1 tactile stimulus may be generated in the fingertip twice per second for example.

However, in the exemplary embodiment, because the position of the fingertip with respect to the partial region corresponding to the icon 11 rather than the entire detection region A illustrated in FIG. 5, in the case where the fingertip is positioned in a region outside the icon 11, the user does not perceive a tactile stimulus in either of the state in which the fingertip is in the detection region A and the state in which the fingertip is in the detection region B on the far side of the detection region A.

In the case of the exemplary embodiment, a tactile stimulus is used to notify the user of the reception of a process instruction, but it is also possible to notify the user of the reception of a process instruction through a change in the appearance of the floating image #1 presented in midair. For example, a method may be used in which, when a process instruction is received, the brightness, color tone, or the like of the portion (herein, the icon 11) indicating the process target of the received instruction regarding a process within the floating image #1 is changed. In addition, air pressure may also be used instead of acoustic radiation pressure generated by an ultrasonic transducer array.

Exemplary Embodiment 3

<System Configuration>

Figure 7:
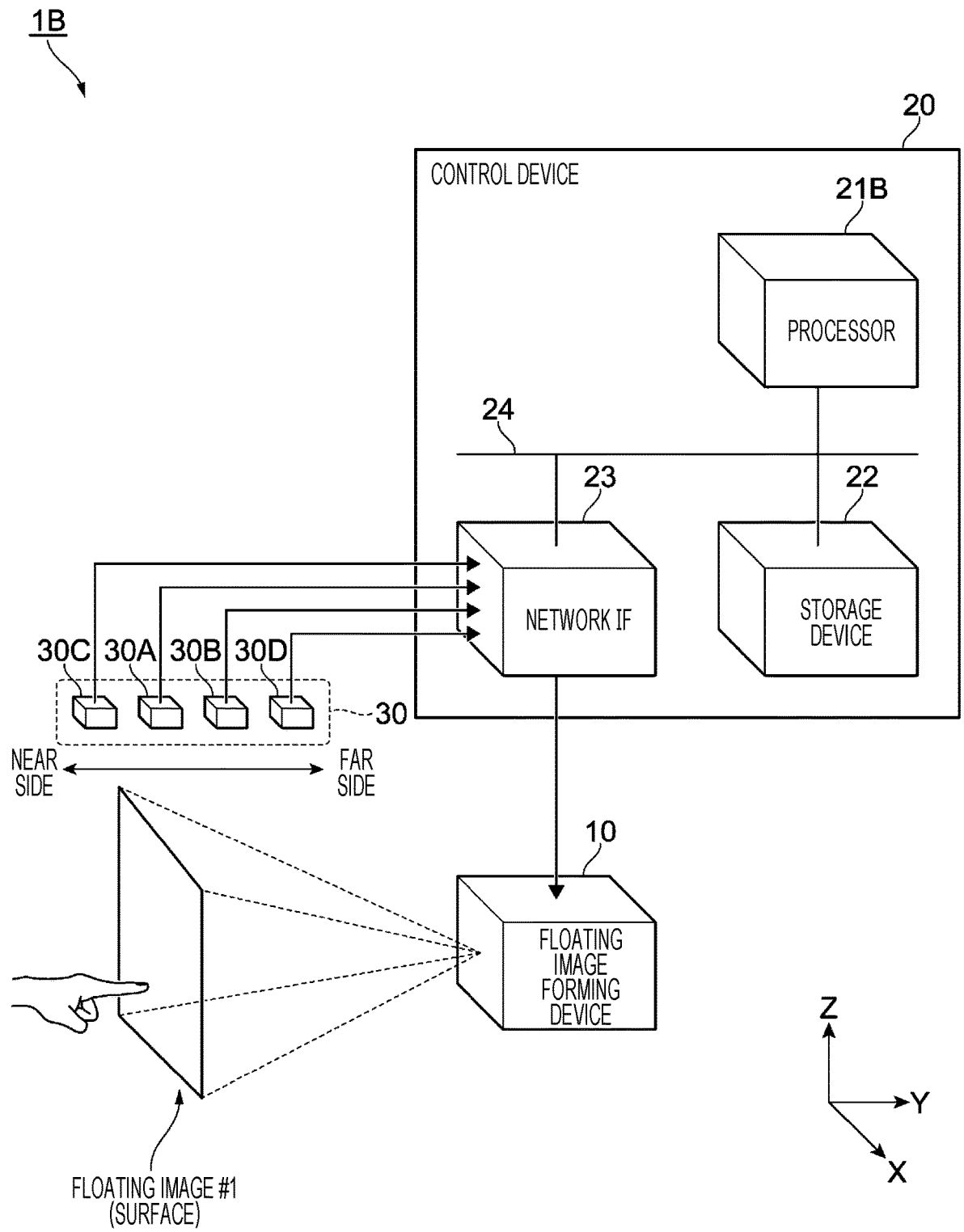
FIG. 7 is a diagram illustrating an exemplary configuration of an information processing system used in Exemplary Embodiment 3.

FIG. 7 is a diagram illustrating an exemplary configuration of an information processing system 1B used in Exemplary Embodiment 3. In FIG. 7, portions that correspond to FIG. 1 are denoted with the same signs.

The information processing system 1B according to the exemplary embodiment is used to explain a case in which the second floating image is additionally presented at a position depending on the positional relationship between the fingertip treated as the target of detection and the detection region A. Hereinafter, the second floating image is designated the floating image #2.

The information processing system 1B illustrated in FIG. 7 differs from the information processing system 1 according to Exemplary Embodiment 1 (see FIG. 1) in that a sensor 30C and a sensor 30D are added.

In the case of the exemplary embodiment, the sensor 30C, the sensor 30A, the sensor 30B, and the sensor 30D are disposed in the direction going from the near side to the far side from the perspective of the position of the user who points with his or her fingertip treated as the target of detection.

Figure 8:
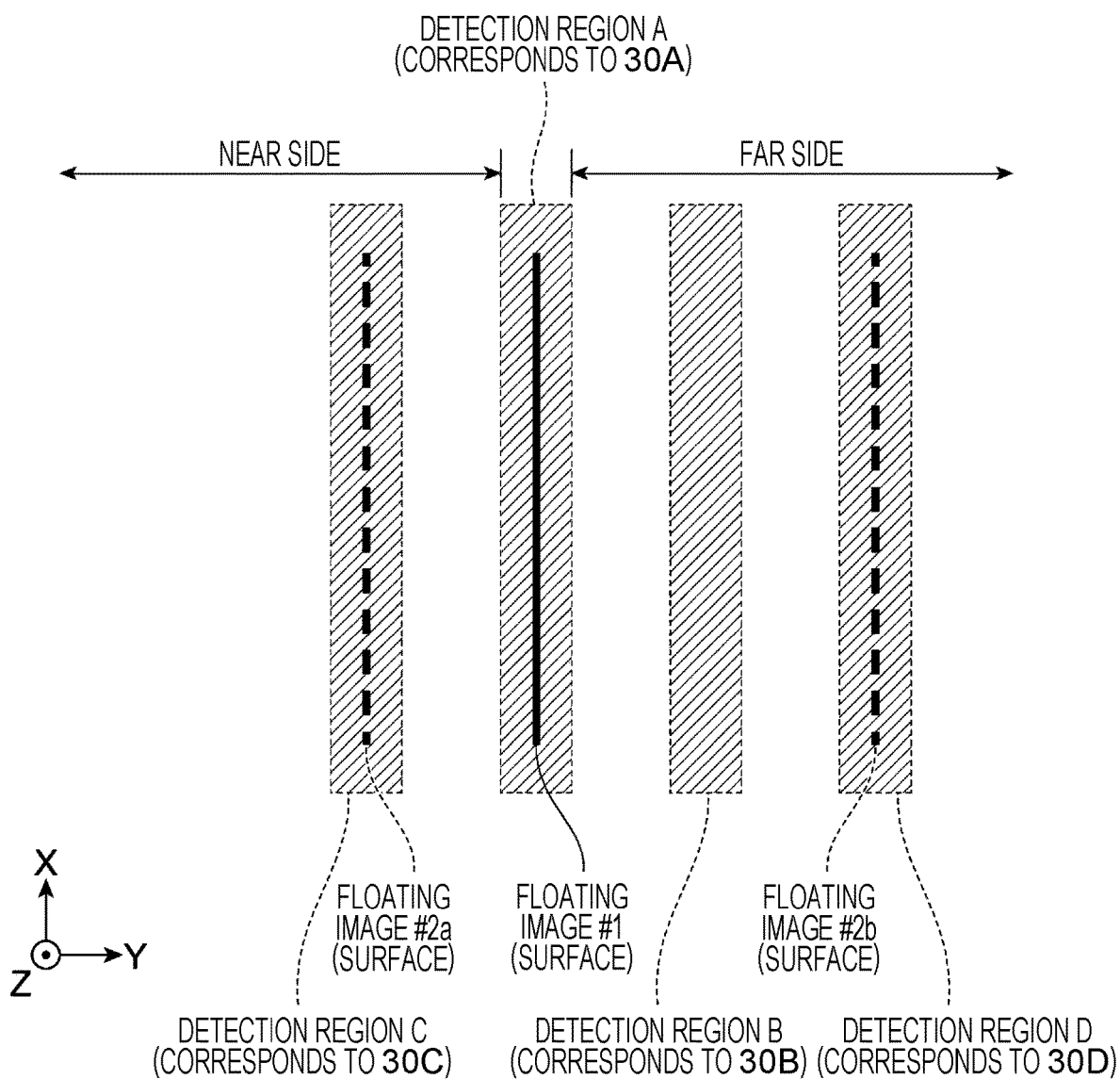
FIG. 8 is a diagram explaining a positional relationship between four detection regions corresponding to four sensors.

FIG. 8 is a diagram explaining a positional relationship between four detection regions A to D corresponding to the four sensors 30A to 30D.

The detection region C corresponding to the sensor 30A is disposed at a position on the near side of the detection region A corresponding to the sensor 30A. The detection region C corresponding to the sensor 30C is positioned to include a second floating image presented at a position on the near side of the first floating image presented inside the detection region A. Hereinafter, the second floating image presented at the position corresponding to the detection region C is designated the floating image #2a.

The detection region D corresponding to the sensor 30D is disposed at a position on the far side of the detection region B corresponding to the sensor 30B. The detection region D corresponding to the sensor 30D is positioned to include a second floating image presented at a position on the far side of the detection region B. Hereinafter, the second floating image presented at the position corresponding to the detection region D is designated the floating image #2b.

Herein, the floating image #2a and the floating image #2b are examples of the second floating image.

Figure 9:
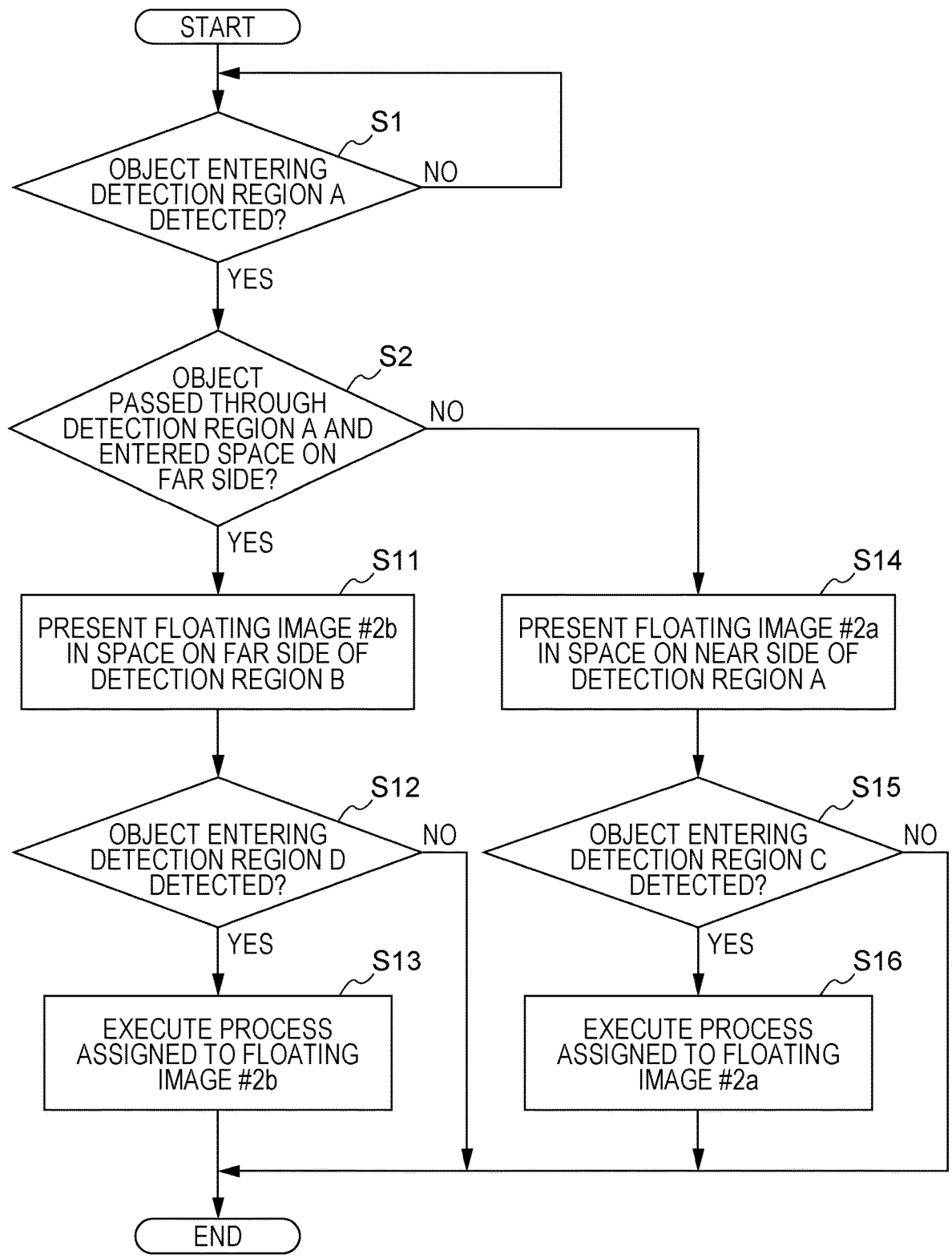
FIG. 9 is a flowchart explaining exemplary processing operations by a processor used in Exemplary Embodiment 3.

FIG. 9 is a flowchart explaining exemplary processing operations by a processor 21B (see FIG. 7) used in Exemplary Embodiment 3. In FIG. 9, portions that correspond to FIG. 4 are denoted with the same signs.

In the processor 21B according to the exemplary embodiment, the processes up to step 2 are the same as Exemplary Embodiment 1. In other words, in the case of detecting an objecting entering the detection region A from the space on the near side, it is determined whether the detected object remains in the detection region A or has passed through the detection region A and entered the space on the far side.

If a positive result is obtained in step 2, the processor 21B presents the floating image #2b in the space on the far side of the detection region B (step 11). The content of step 11 is one example of the process executed in step 3 (see FIG. 4).

Figure 10A:
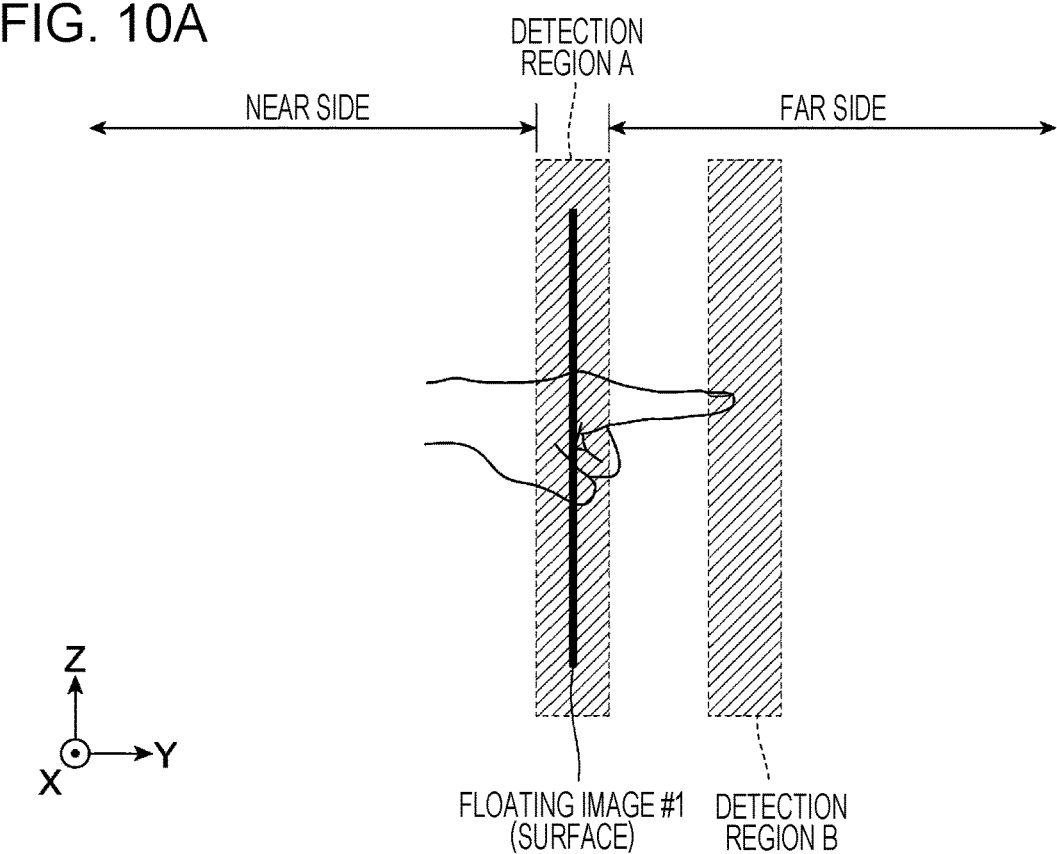
Figure 10B:
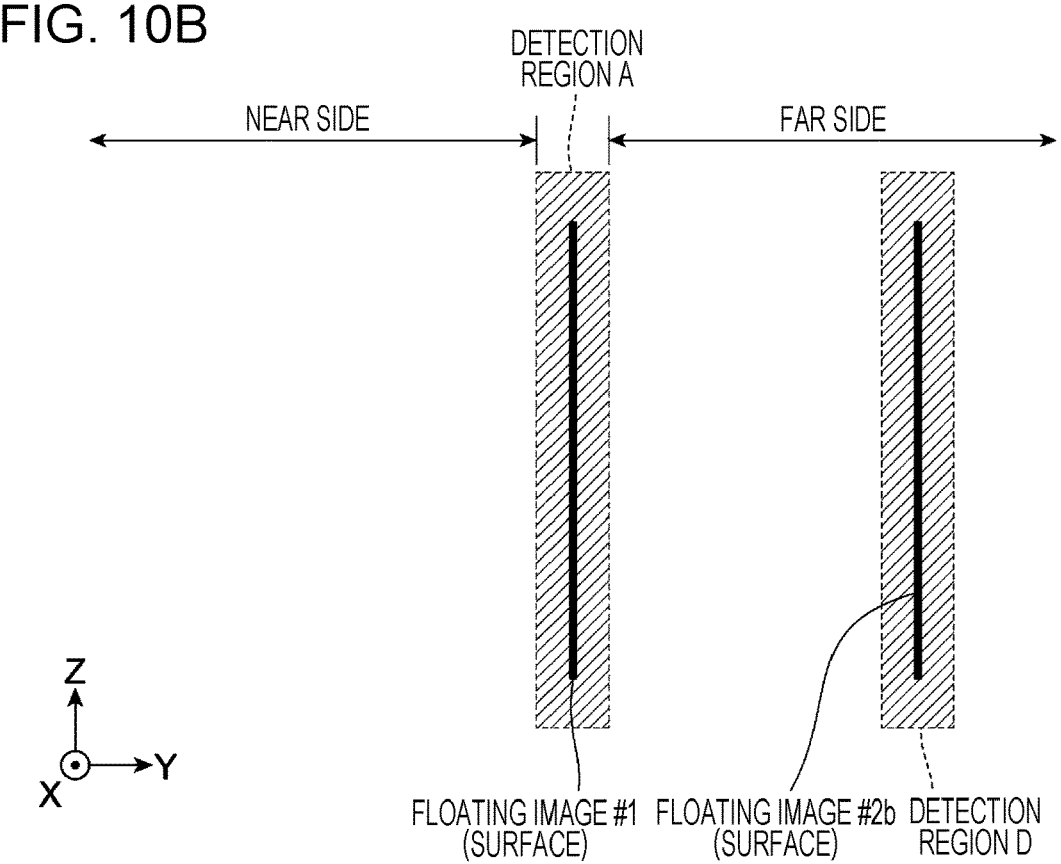

FIGS. 10A and 10B are diagrams explaining exemplary processing operations executed in a case where the fingertip passes through the detection region A, in which FIG. 10A illustrates a state in which the fingertip has passed through the detection region A, and FIG. 10B illustrates the position of a floating image #2b as an example of a second floating image presented after the detection of the passing through.

The floating image #2b may be presented overlapping a position visible through the floating image #1, but may also be presented at a position that does not overlap the floating image #1 from the perspective of the user.

Also, in the example of FIGS. 10A and 10B, the floating image #1 is still presented in the detection region A even after the fingertip is detected, but it may also be configured such that only the floating image #2b is presented after the fingertip is detected.

The description will now return to FIG. 9.

Next, the processor 21B determines whether or not an object entering the detection region D has been detected (step 12).

If a positive result is obtained in step 12, the processor 21B executes a process assigned to the floating image #2b (step 13). Like the case of Exemplary Embodiment 1, the content of the process at this point may be a process that puts a terminal treated as the process target into a predetermined state, or a process that presents another floating image. The process executed in step 13 is one example of a third process.

On the other hand, if a negative result is obtained in step 12, the processor 21B ends the process.

The description will now return to the process of step 2.

If a negative result is obtained in step 2, the processor 21B presents the floating image #2a in the space on the near side of the detection region A (step 14). The content of step 14 is one example of the process executed in step 4 (see FIG. 4).

Figure 11A:
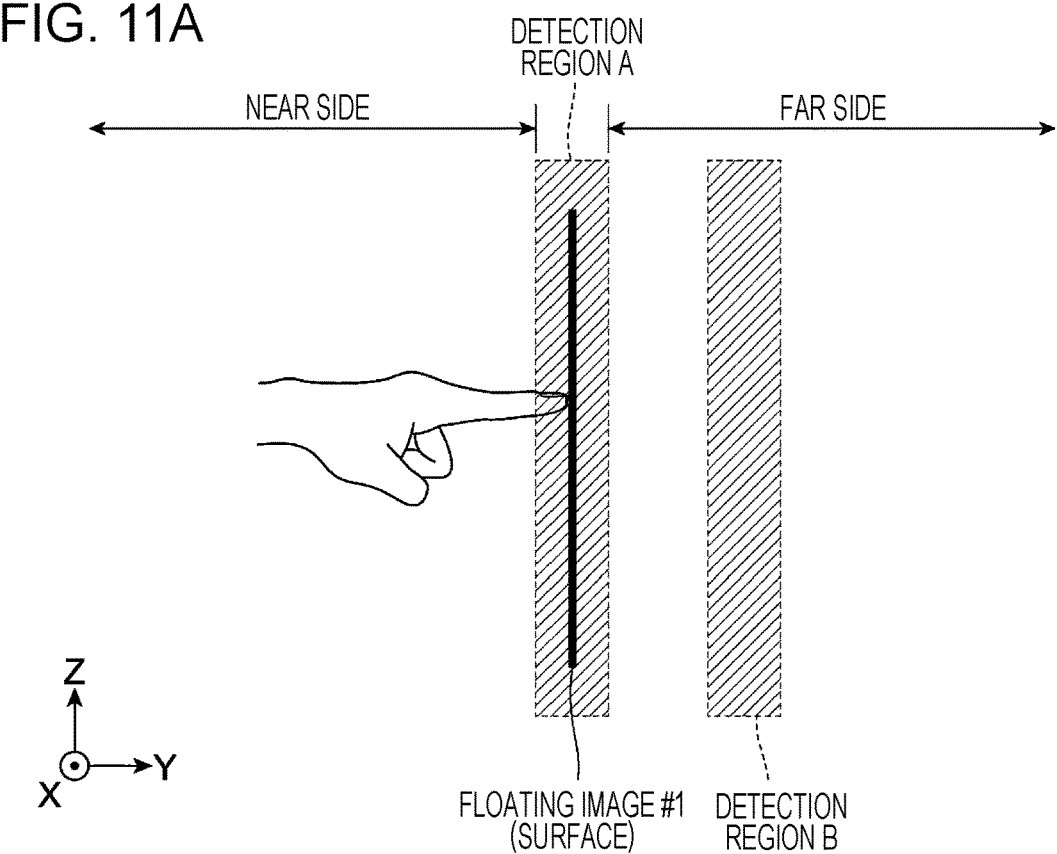
Figure 11B:
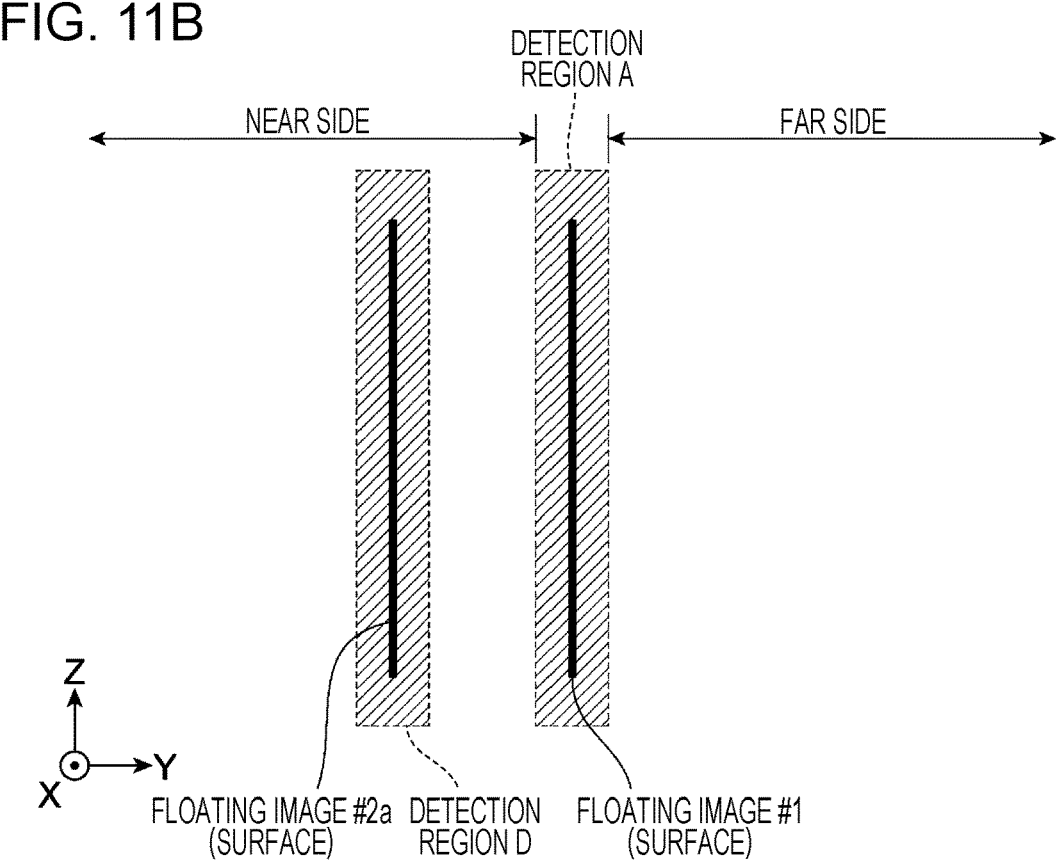

FIGS. 11A and 11B are diagrams explaining exemplary processing operations executed in a case where the fingertip is in the detection region A, in which FIG. 11A illustrates a state in which the fingertip is in the detection region A, and FIG. 11B illustrates the position of the floating image #2a as an example of the second floating image presented after the detection of the passing through.

The floating image #2a may also be presented overlapping the floating image #1 at a position on the near side of the floating image #1. In this case, the floating image #1 is visible through the floating image #2a. The floating image #2a may also be presented at a position that does not overlap the floating image #1 from the perspective of the user.

Also, in the example of FIGS. 11A and 11B, the floating image #1 is still presented in the detection region A even after the fingertip is detected, but it may also be configured such that only the floating image #2a is presented after the fingertip is detected.

The description will now return to FIG. 9.

Next, the processor 21B determines whether or not an object entering the detection region C has been detected (step 15).

If a positive result is obtained in step 15, the processor 21B executes a process assigned to the floating image #2a (step 16). Like the case of Exemplary Embodiment 1, the content of the process at this point may be a process that puts a terminal treated as the process target into a predetermined state, or a process that presents another floating image. The process executed in step 16 is one example of a third process.

On the other hand, if a negative result is obtained in step 15, the processor 21B ends the process.

Figure 12:
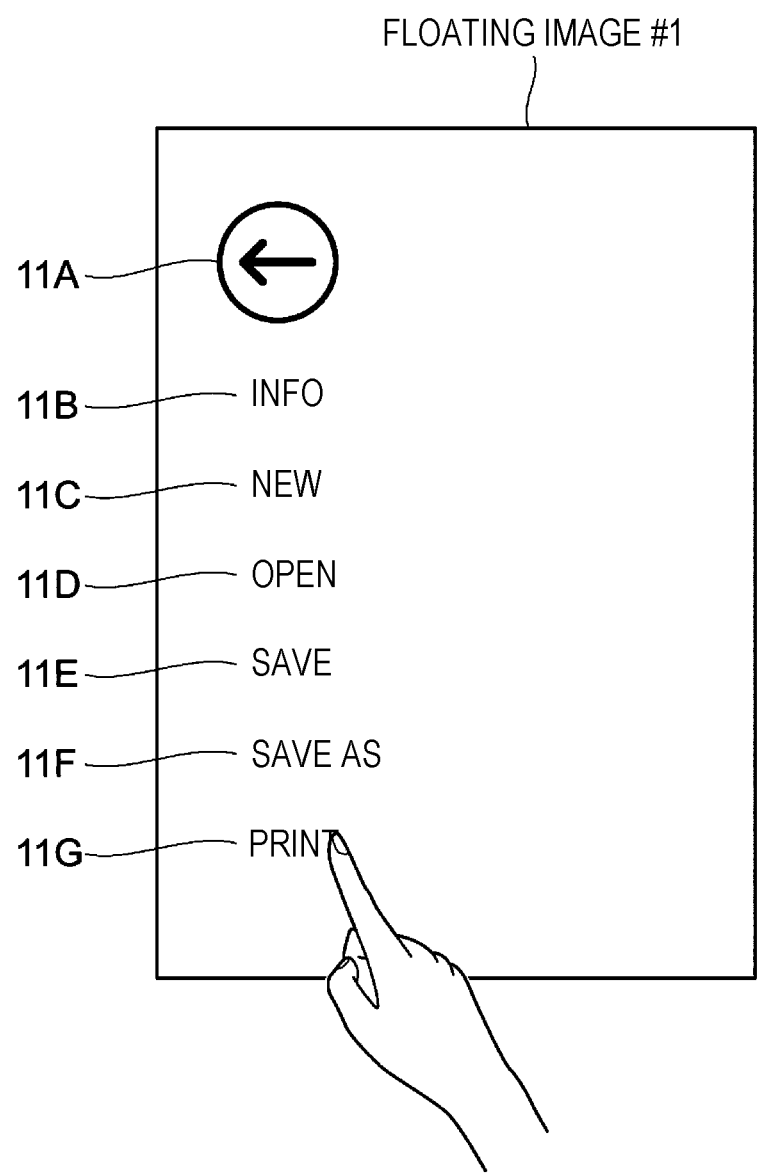
FIG. 12 is a diagram illustrating a specific example of the floating image #1 as an example of the first floating image included in the detection region A, and explaining a case in which a specific sub-region is used to direct a process.
Figure 13:
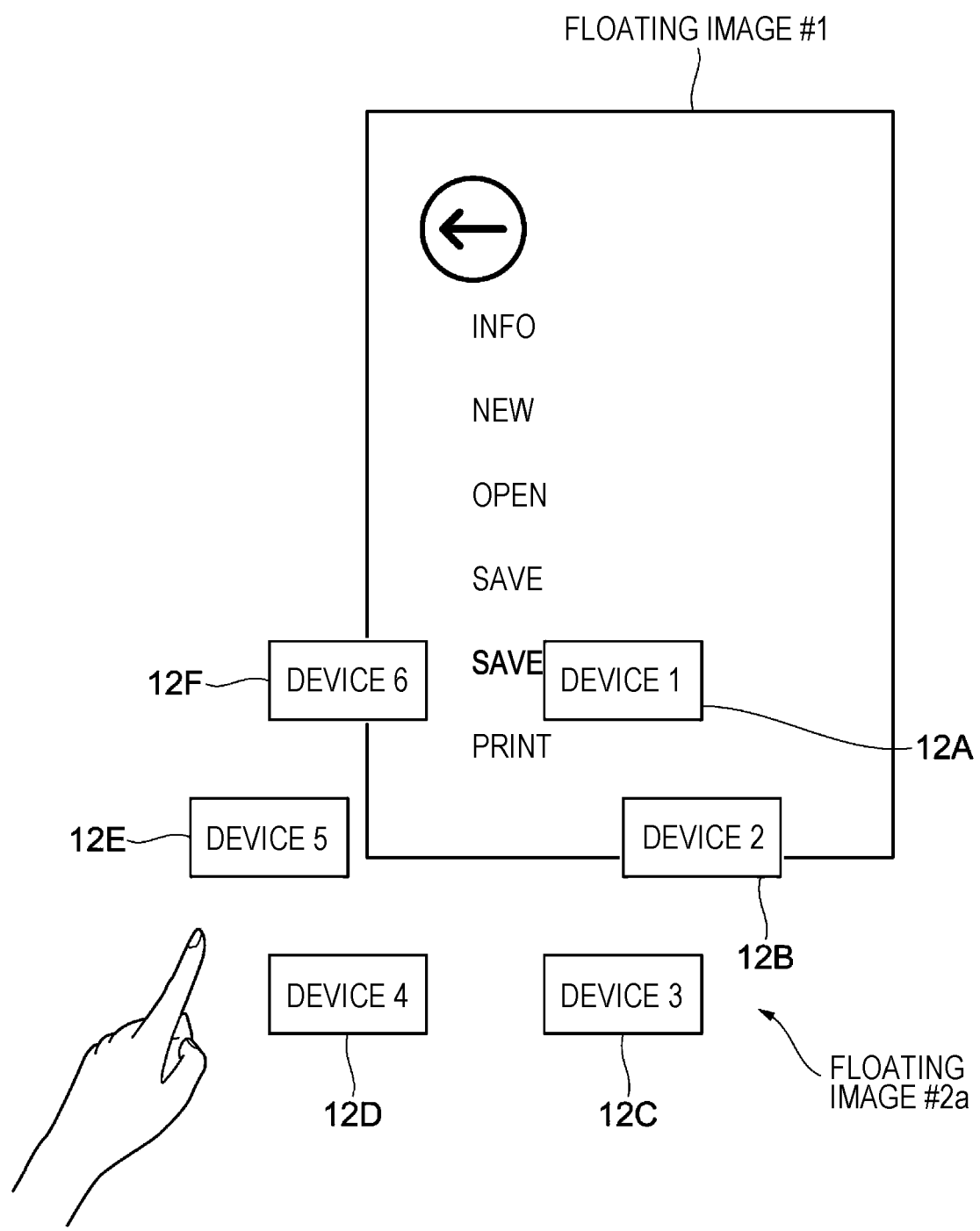
FIG. 13 is a diagram illustrating a specific example of a floating image #2 as an example of the second floating image presented on the near side of the detection region A.

Here, FIGS. 12 and 13 will be used to describe a specific example of FIGS. 11A and 11B.

FIG. 12 is a diagram illustrating a specific example of a floating image included in the detection region A, and explaining a case in which a specific sub-region is used to direct a process. FIG. 13 is a diagram illustrating a specific example of a floating image #2a presented on the near side of the detection region A.

In FIG. 12, a screen like one displayed on a PC or a smartphone is displayed as the floating image #1. On the screen, seven buttons 11A to 11G are arranged. The button 11A is a "Back" button, the button 11B is a button displaying "Info", the button 11C is a button that creates a "New" file, the button 11D is an "Open" button, the button 11E is a "Save" button, the button 11F is a "Save as" button, and the button 11G is a "Print" button.

The detection region A is provided with sub-regions corresponding to the buttons 11A to 11G. Herein, the sensor 30A (see FIG. 7) or the like is used to detect whether the user is attempting to perform a "touch" or a "deep touch" on one of the buttons provided in the floating image.

For example, in the case of detecting that the fingertip moves from the state of FIG. 3A to FIG. 3B and additionally from FIG. 3B to FIG. 3A with respect to the sub-region corresponding to the "Print" button (that is, the button 11G) within a fixed amount of time, an option group for selecting the output destination of the printed material is presented on the near side of the floating image included in the detection region A as an example of the floating image #2a, as illustrated in FIG. 13.

In the option group, six options 12A to 12F are arranged. The option 12A indicates Printer 1, the option 12B indicates Printer 2, the option 12C indicates Printer 3, the option 12D indicates Printer 4, the option 12E indicates Printer 5, and the option 12F indicates Printer 6.

In the case of the exemplary embodiment, the interior of the detection region C corresponding to the option group and a nearby object are detected by the sensor 30C (see FIG. 7). The detection region C is provided with sub-regions for the options 12A to 12F provided in the option group, and the sensor 30C detects whether the user is attempting to perform a "touch" or a "deep touch" on one of the options.

The processor 21B (see FIG. 7) transmits a print instruction to the printer corresponding to the sub-region entered by the user's fingertip. For example, in the case of detecting that the fingertip moves from the state of FIG. 3A to FIG. 3B and additionally from FIG. 3B to FIG. 3A with respect to the sub-region corresponding to the option 12E within a fixed amount of time, the processor 21B transmits a print instruction to Printer 5.

Note that in the case of FIG. 13, the entire option group for selecting the output destination of the printed material is treated as the single floating image #2a, but each of the options 12A to 12F may also be treated as different floating images. In this case, six second floating images are presented in midair.

Exemplary Modification 1

In the case of the flowchart illustrated in FIG. 9, step 15 does not distinguish the direction from which the fingertip enters the detection region C, but it is also possible to determine whether the fingertip entered the detection region C from the far side or entered the detection region C from the near side, and execute a different process for each case.

For example, in the case where the fingertip enters a sub-region from the far side, a print instruction may be transmitted to the printer corresponding to the sub-region entered by the fingertip, whereas in the case where the fingertip enters a sub-region from the near side, detailed information about the printer assigned to the sub-region entered by the fingertip may be presented. At this point, the detailed information may be presented using the second floating image, or may be presented by newly forming a third floating image.

Exemplary Modification 2

In the case of the flowchart illustrated in FIG. 9, in both the case of obtaining a positive result in step 2 and the case of obtaining a negative result in step 2, the second floating image is presented at a position corresponding to each case and a corresponding process is executed, but the process after the result of the determined for either case may be replaced by the process illustrated in Exemplary Embodiment 1.

For example, steps 11 to 13 may be replaced by step 3 (see FIG. 4). In this case, the processor 21B (see FIG. 7) may also transmit a print instruction to the printer set as default.

Exemplary Modification 3

This example describes a case of utilizing the motion of an object that has passed through from the near side to the far side the detection region A passing through again from the far side to the near side of the detection region A to direct a process.

Figure 14:
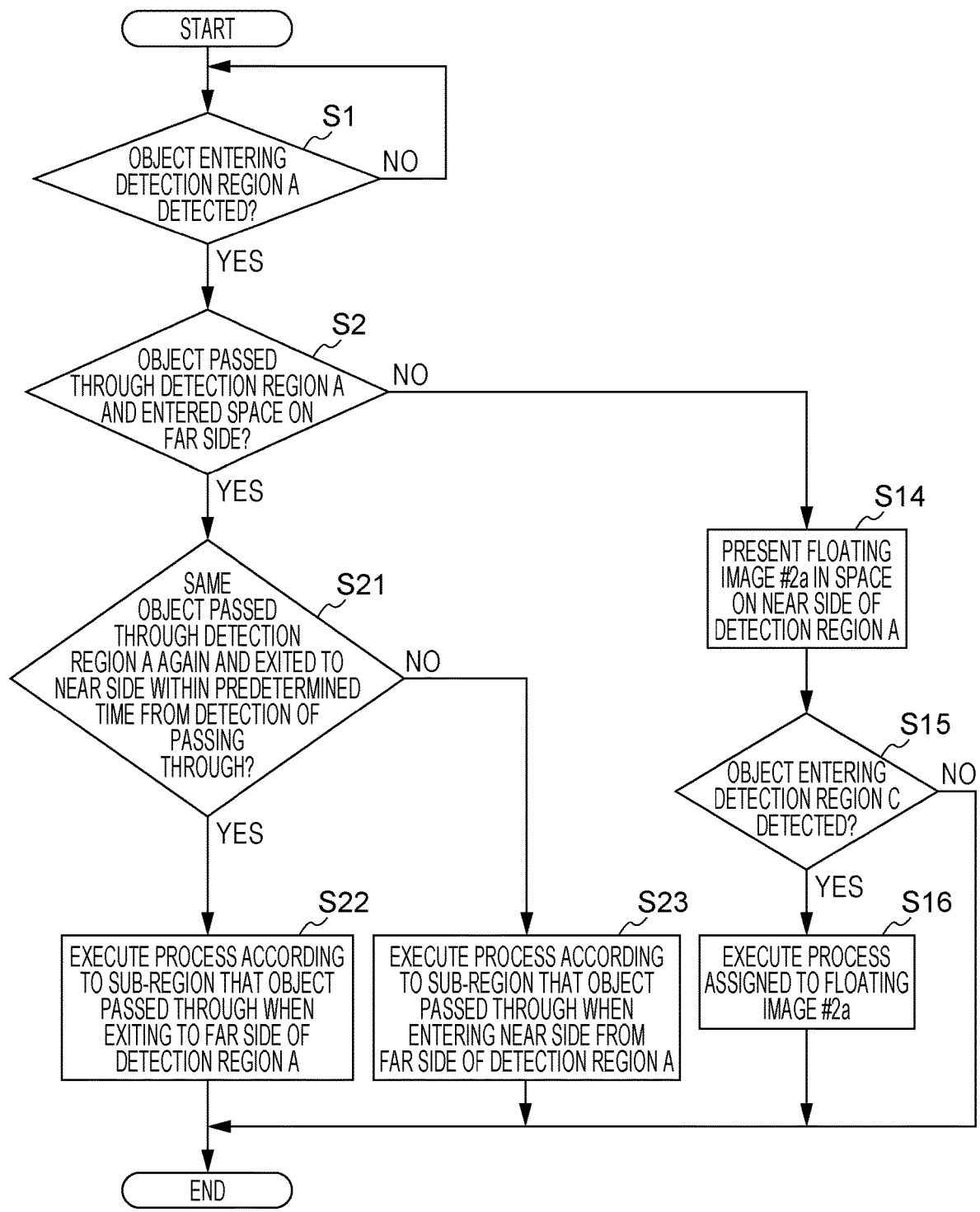
FIG. 14 is a flowchart explaining exemplary processing operations according to Modification 3 of Exemplary Embodiment 3.

FIG. 14 is a flowchart explaining exemplary processing operations according to Modification 3 of Exemplary Embodiment 3. In FIG. 14, portions that correspond to FIG. 9 are denoted with the same signs. In FIG. 14, the processing operations executed after obtaining a positive result in step 2 illustrated in FIG. 9 are different.

The case of obtaining a positive result in step 2 refers to the case of detecting an object passing through the detection region A from the near side to the far side.

In the case of FIG. 14, the processor 21B (see FIG. 7) determines whether or not, within a predetermined amount of time from the detection of the passing through, the same object passes through the detection region A again and exits to the near side (step 21). In the case of this example, the process to be executed by the processor 21B is not confirmed from simply the detection of an object passing through the detection region A.

If a positive result is obtained in step 21, the processor 21B executes a process according to the sub-region that the object passed through when exiting to the far side of the detection region A (step 22). The process at this point is an instruction to present a second floating image #2 or to perform a process on a process target.

On the other hand, if a negative result is obtained in step 21, the processor 21B executes a process according to the sub-region that the object passed through when entering the near side from the far side of the detection region A (step 23).

Figure 15A:
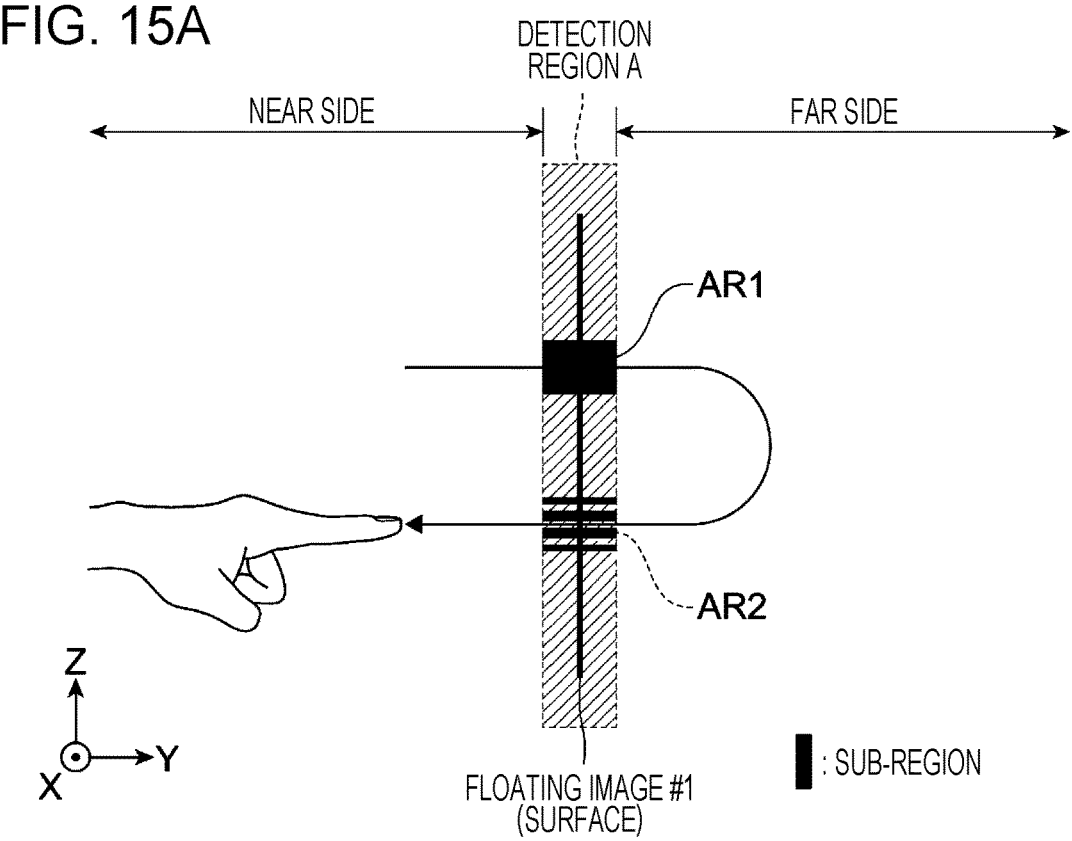
Figure 15B:
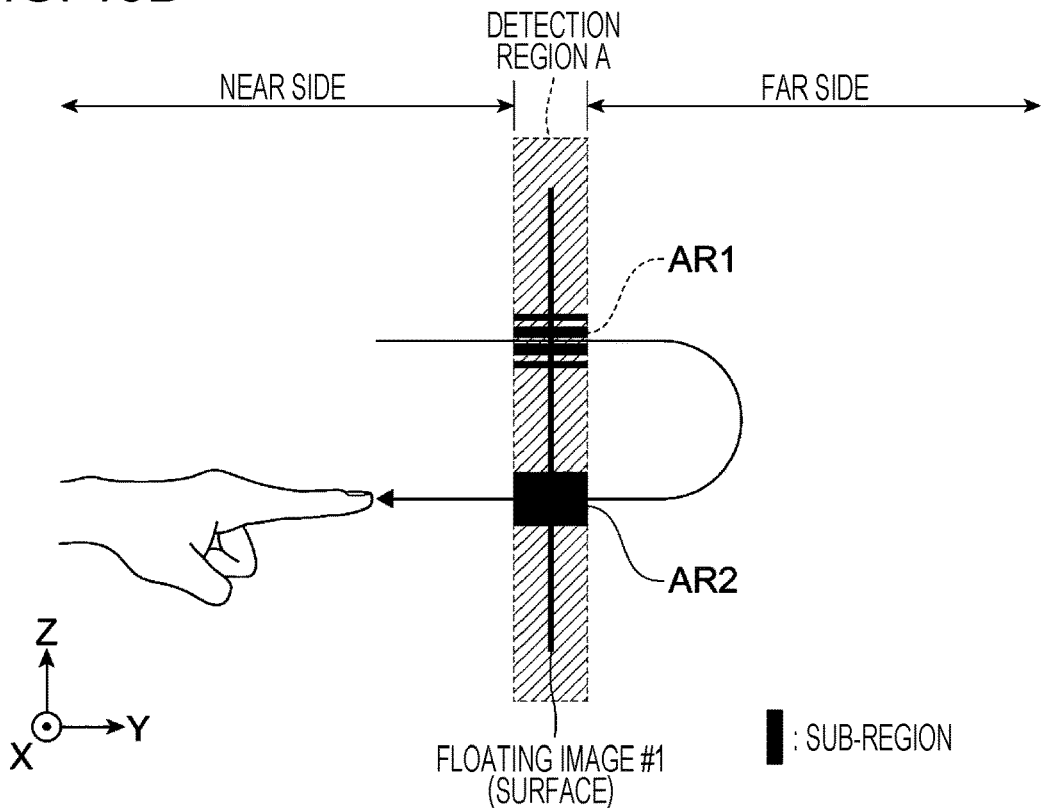

FIGS. 15A and 15B are diagrams explaining an example of a gesture in which the fingertip is made to pass through the detection region A from the near side of the detection region A to the far side of the detection region A, and then return back to the near side from the far side by passing through the detection region A again, in which FIG. 15A illustrates a sub-region used to direct a process in a case where the fingertip returns to the near side within t seconds from the timing of passing through the detection region A when moving from the near side to the far side, and FIG. 15B illustrates a sub-region used to direct a process in a case where the fingertip returns to the near side after t seconds or more elapse from the timing of passing through the detection region A when moving from the near side to the far side.

Herein, t seconds corresponds to the predetermined amount of time in step 21 (see FIG. 14).

FIG. 15A corresponds to the case of obtaining a positive result in step 21, and FIG. 15B corresponds to the case of obtaining a negative result in step 21.

In both the case of FIG. 15A and the case of FIG. 15B, the fingertip passes through the same path. In other words, the fingertip initially passes through a sub-region AR1 disposed in the detection region A to the far side, and when returning to the near side, the fingertip passes through a different sub-region AR2.

Note that this example assumes that it is possible to detect which sub-region an object passes through.

In the case where the fingertip returns to the near side in a relatively short time like in the case of FIG. 15A, the sub-region AR1 that the fingertip initially passed through is treated as the region intended by the user, and the process assigned to the sub-region AR1 is executed. The sub-region AR1 is an example of a first sub-region. At the position corresponding to the sub-region AR1 within the floating image #1, a user interface element such as one of the buttons illustrated in FIG. 12 or one of the options illustrated in FIG. 13 is disposed.

On the other hand, in the case where the fingertip takes a relatively long time to return to the near side like in the case of FIG. 15B, the sub-region AR2 that the returning fingertip passes through is treated as the region intended by the user, and the process assigned to the sub-region AR2 is executed. The sub-region AR2 is an example of a second sub-region. At the position corresponding to the sub-region AR2 within the floating image #1, a user interface element is disposed similarly to the sub-region AR1.

Note that which process instructions are assigned to the sub-region AR1 and the sub-region AR2 are determined by initial settings. However, the assignment of process instructions to the sub-region AR and the sub-region AR2 may also be user-configurable.

For example, it is possible to configure settings such that if a positive result is obtained in step 21, the process in step 23 is executed, and if a negative result is obtained in step 21, the process in step 22 is executed.

Exemplary Modification 4

In the case of Exemplary Modification 3, if the fingertip is made to pass through the detection region A from the near side of the detection region A and move to the far side of the detection region A, and then the fingertip is made to pass through the detection region A again from the far side and return to the near side, one of the sub-regions that the fingertip passes through is used to direct a process, but it is also possible to utilize both sub-regions to direct processes.

Figure 16:
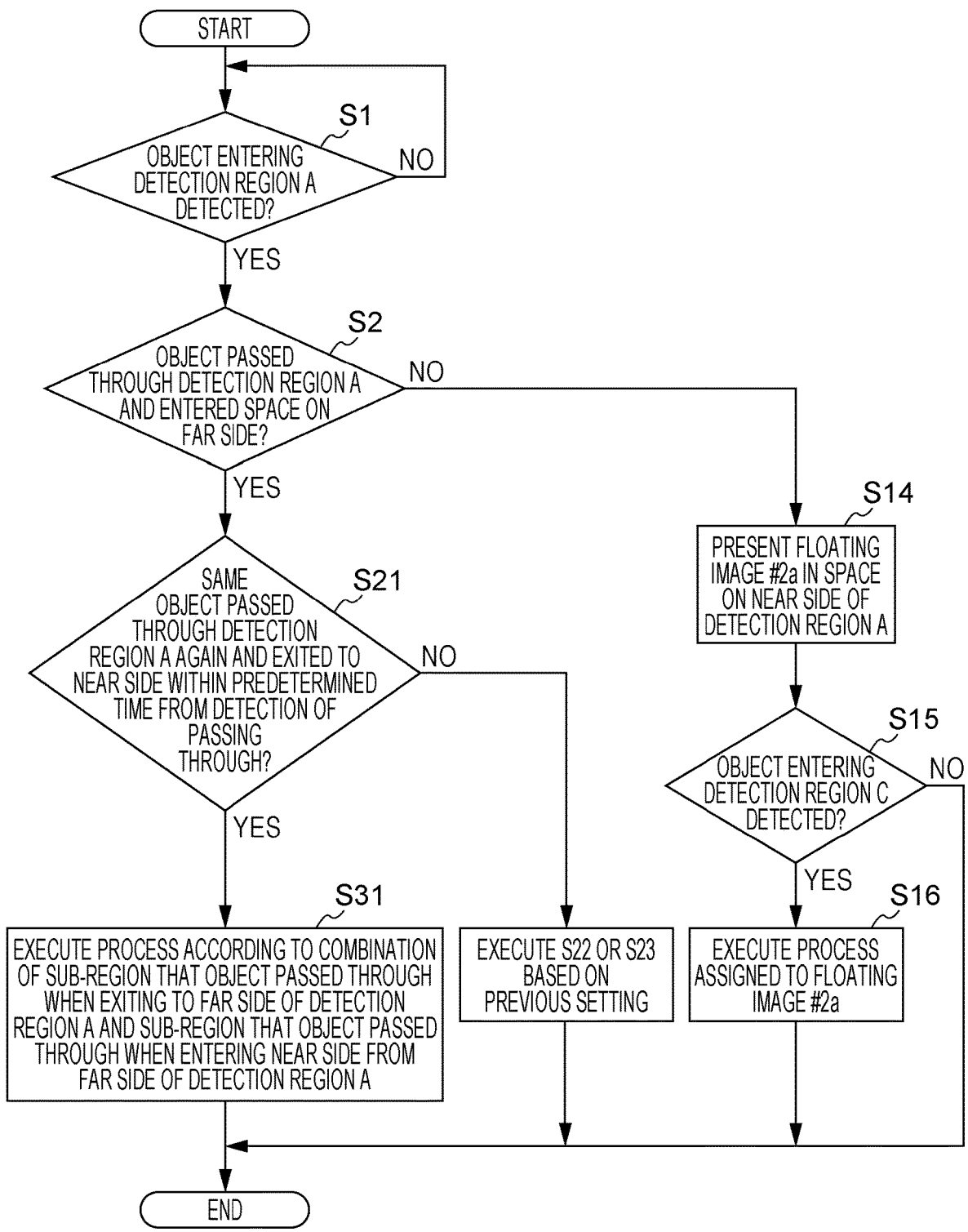
FIG. 16 is a flowchart explaining exemplary processing operations according to Modification 4 of Exemplary Embodiment 3.

FIG. 16 is a flowchart explaining exemplary processing operations according to Modification 4 of Exemplary Embodiment 3. In FIG. 16, portions that correspond to FIG. 9 are denoted with the same signs. In FIG. 16, the processing operations executed after obtaining a positive result in step 2 illustrated in FIG. 9 are different.

In the case of FIG. 16, the processor 21B (see FIG. 7) also determines whether or not, within a predetermined amount of time from the detection of the passing through, the same object passes through the detection region A again and exits to the near side (step 21). Likewise, in the case of this example, the process to be executed by the processor 21B is not confirmed from simply the detection of an object passing through the detection region A.

If a positive result is obtained in step 21, the processor 21B executes a process according to the combination of the sub-region that an object passes through when passing through the detection region A from the near side of the detection region A and exiting to the far side, and the sub-region that the same object passes through when passing through the detection region A from the far side of the detection region A and entering the near side (step 31). The process at this point is an instruction to present the floating image #2 or an instruction given to a terminal treated as the process target.

On the other hand, if a negative result is obtained in step 21, the processor 21B executes step 22 or 23 on the basis of preset settings.

Figure 17A:
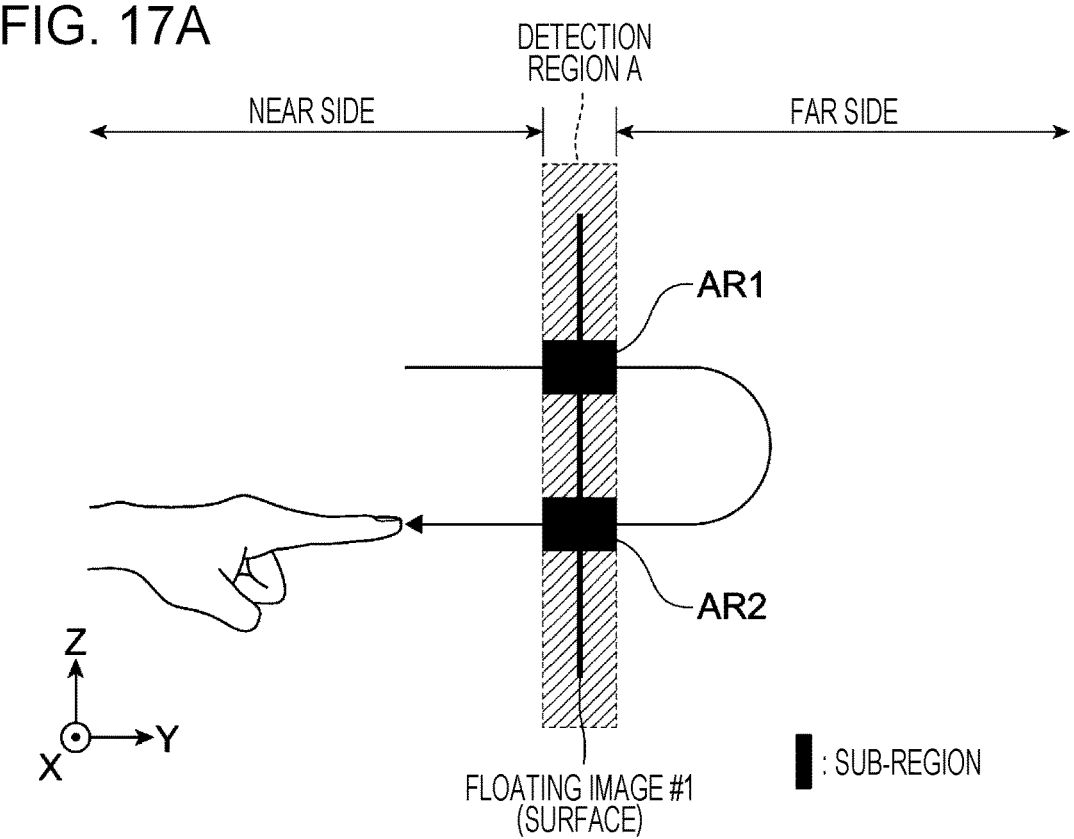
Figure 17B:
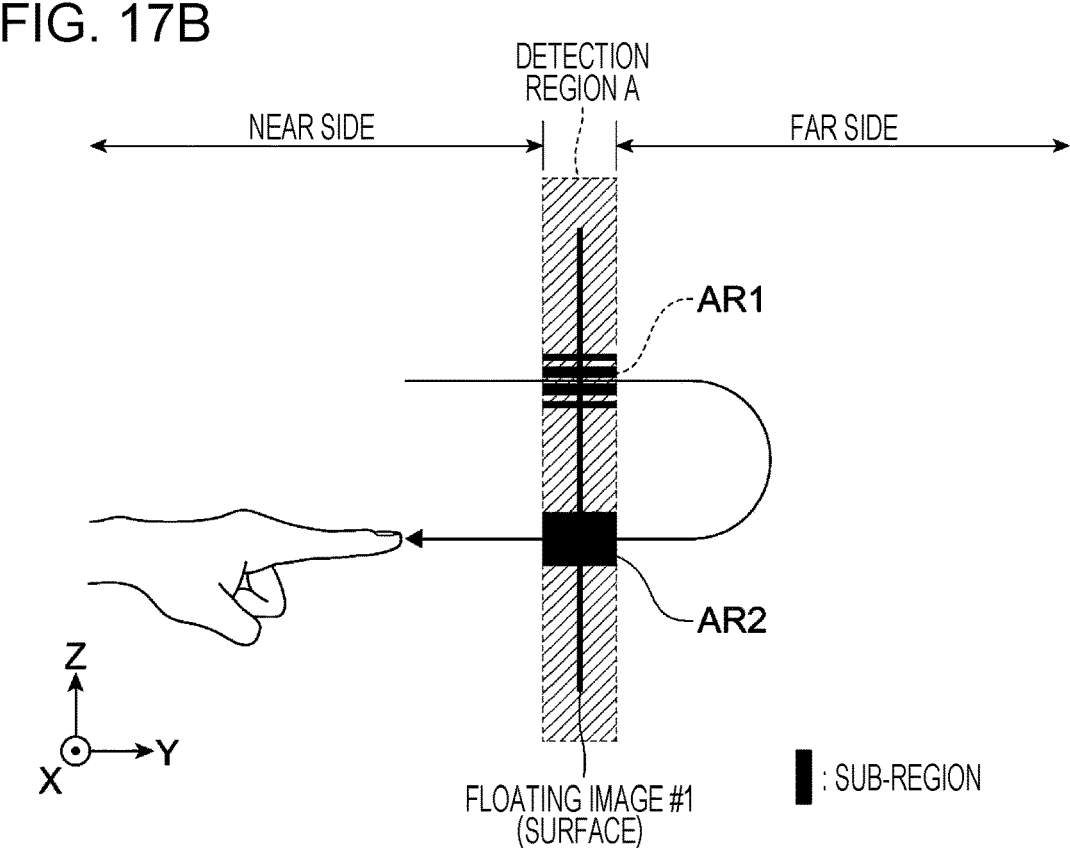

FIGS. 17A and 17B are diagrams explaining an example of a gesture in which the fingertip is made to pass through the detection region A from the near side of the detection region A to the far side of the detection region A, and then return back to the near side from the far side by passing through the detection region A again, in which FIG. 17A illustrates a sub-region used to direct a process in a case where a fingertip moves from the near side to the far side of the detection region A and returns to the near side within t seconds from the timing of passing through the detection region A, and FIG. 17B illustrates a sub-region used to direct a process in a case where the fingertip moves from the near side to the far side of the detection region A and returns to the near side after t seconds or more elapse from the timing of passing through the detection region A.

The example of FIGS. 17A and 17B is different from Exemplary Modification 3 in that both the sub-region AR1 and the sub-region AR2 are used to direct processes in the case of FIG. 17A. In the case of FIGS. 17A and 17B, at each of the position corresponding to the sub-region AR1 and the position corresponding to the sub-region AR2 within the floating image #1, a user interface element such as one of the buttons illustrated in FIG. 12 or one of the options illustrated in FIG. 13 is also disposed.

Exemplary Modification 5

Exemplary Modifications 3 and 4 above describe a case in which multiple sub-regions are disposed in advance in the detection region A, but the processor 21B may also change the content of the floating image according to the content of the sub-region that the fingertip passes through when passing through the detection region A from the near side. For example, at the point in time when the fingertip passes through the detection region A from the near side to the far side, the floating image #1 illustrated in FIG. 12 may be presented, and at the point in time when the fingertip passes through the detection region A from the far side to the near side, the content of the floating image #2a illustrated in FIG. 13 may be presented at the position of the detection region A. In this case, the floating image #2a is not presented in midair.

Exemplary Embodiment 4

Exemplary Embodiments 1 to 3 above illustrate an example of a case in which the first floating image has a flat shape, but the present exemplary embodiment describes a case in which the first floating image has a solid shape.

Figure 18:
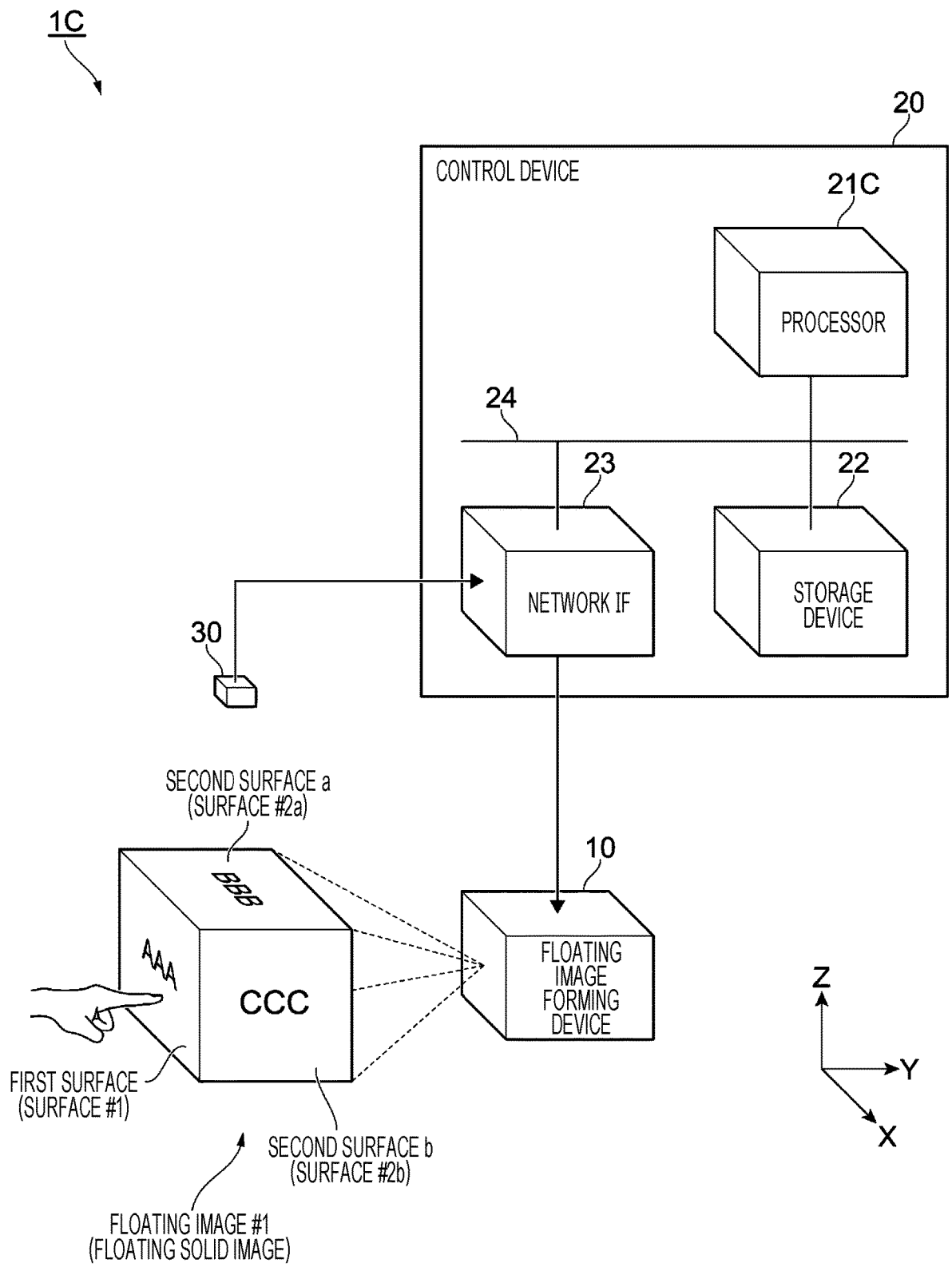
FIG. 18 is a diagram illustrating an exemplary configuration of an information processing system used in Exemplary Embodiment 4.

FIG. 18 is a diagram illustrating an exemplary configuration of an information processing system 1C used in Exemplary Embodiment 4. In FIG. 18, portions that correspond to FIG. 1 are denoted with the same signs.

In the case of the present exemplary embodiment, a processor 21C is used to receive an instruction to present the floating image #1 with the floating image forming device 10 or perform a process.

The floating image forming device 10 illustrated in FIG. 18 presents a three-dimensional floating image (hereinafter referred to as a "floating solid image") in midair as the first floating image. In FIG. 18, a cube whose outline is determined by six faces, or in other words surfaces, is presented in midair, but the floating solid image is not limited to a cube. The floating solid image may also be another type of polyhedron or have a more complex shape. Furthermore, the floating solid image may also be a curved solid.

In FIG. 18, the surface in front on the side closest to the user from among the six surfaces is referred to as the first surface (surface #1), and is distinct from the other surfaces. In the case of FIG. 18, the user is positioned on the left side of the page. However, a surface other than the surface in front may also be treated as the first surface.

In the cube of FIG. 18, the surface with the text "AAA" is the first surface. The cube is a solid whose outline is determined by the first surface, a surface with the text "BBB" (top side), a surface with the text "CCC" (the surface on the right side from the perspective of the user), and three remaining surfaces that are hidden from view in the diagram. In FIG. 18, the surface with the text "BBB" is referred to as the second surface a, and is designated the surface #2a. Also, the surface with the text "CCC" is referred to as the second surface b, and is designated the surface #2b.

In FIG. 18, only a single sensor 30 is illustrated, but this is for the sake of simplicity. In actuality, an appropriate number of sensors 30 are disposed. In the case of using an infrared sensor as the sensor 30, at least two sensors 30 are disposed with respect to each surface. However, the surfaces provided with the sensors 30 may be limited to surfaces that are used to receive a process instruction.

In the case of FIG. 18, the sensors 30 are provided with respect to the three surfaces of the surface in front facing the user, the surface on the top side, and the surface on the right side.

Figure 19A:
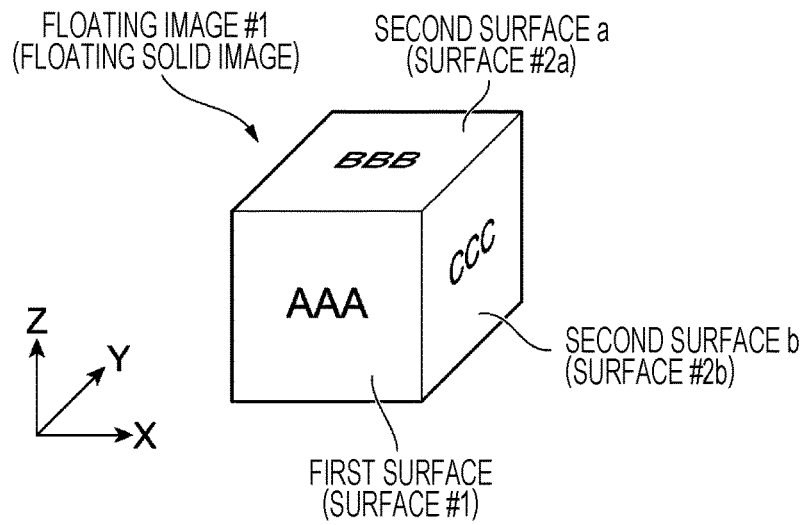
Figure 19B:
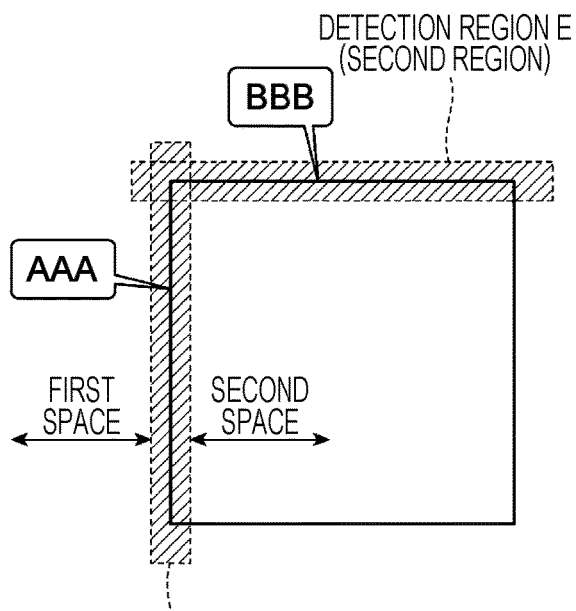
Figure 19C:
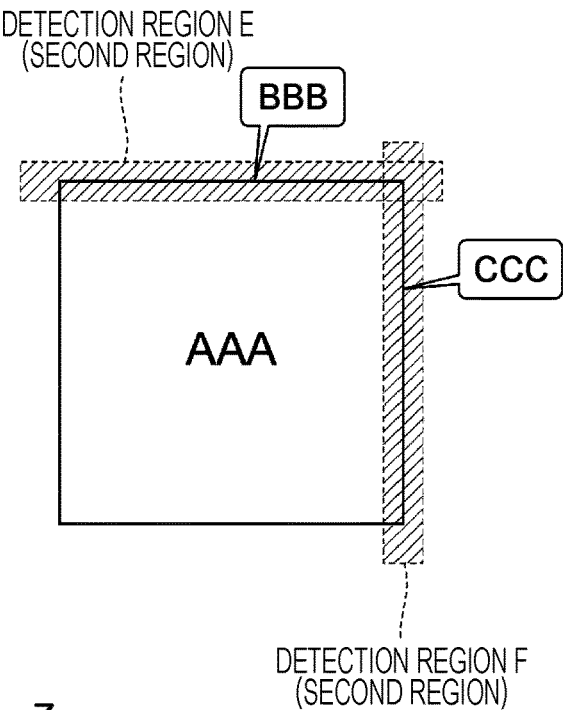

FIGS. 19A to 19C are diagrams explaining a positional relationship between each surface of the floating solid image in FIG. 18 and detection regions, in which FIG. 19A illustrates information presented on each surface of the floating solid image, FIG. 19B illustrates an example of setting detection regions in a case of viewing the floating solid image from the surface on the right side from the user's point of view, and FIG. 19C illustrates an example of setting detection regions in a case where the user views the front surface of the floating solid image.

In the present exemplary embodiment, the region where the first surface is displayed as several millimeters in front and behind are treated as the detection region A corresponding to the first surface, and the space between the detection region A and the user is referred to as the first space. Like the exemplary embodiments described earlier, the detection region A is an example of a first region. In addition, the detection region A may also be a surface, and may be substantially the same as the first surface, for example.

Note that FIGS. 19A to 19C illustrate detection regions set in correspondence with the three surfaces labeled with the text "AAA", "BBB", and "CCC" visible on the page, but detection regions may also set respectively for each of the other three surfaces. By setting a detection region for each surface, it is possible to detect the motion of the fingertip entering the floating solid image from any surface and also exiting to the space surrounding any of the surfaces.

Also, in the case where the shape or size of the floating solid image presented in midair changes, it is desirable to re-set the positions the detection regions according to the changed shape of the floating solid image. Note that in cases where the floating solid image rotates or the like in response to an action such as a gesture performed on the floating solid image by the user, and the content of the user interface element appearing at the position closest to the user changes, the arrangement of the detection regions is changed according to the process assigned to the changed user interface element.

Also, in FIGS. 19A to 19C, the space on the far side of the detection region A from the perspective of the user is referred to as the second space.

Also, in FIGS. 19A to 19C, a detection region E corresponding to the surface on the top side and a detection region F corresponding to the surface on the right side from the perspective of the user are provided. Both the detection region E and the detection region F are examples of a second region.

Figure 20:
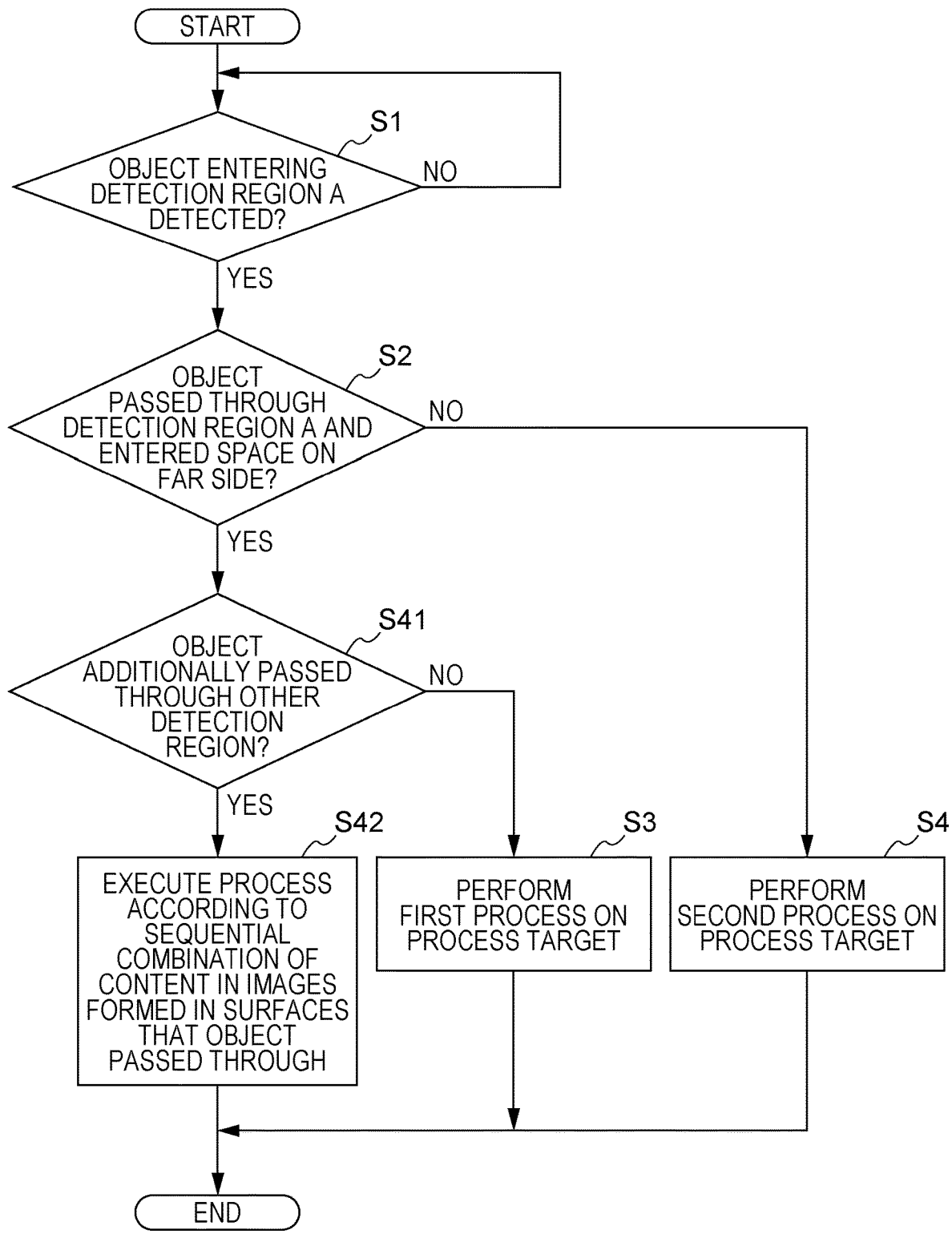
FIG. 20 is a flowchart explaining exemplary processing operations by a processor used in Exemplary Embodiment 4.

FIG. 20 is a flowchart explaining exemplary processing operations by the processor 21 (see FIG. 18) used in Exemplary Embodiment 4. In FIG. 20, portions that correspond to FIG. 4 are denoted with the same signs.

In the processor 21C according to the exemplary embodiment, the processes up to step 2 are the same as Exemplary Embodiment 1. In other words, in the case of detecting an objecting entering the detection region A from the space on the near side, it is determined whether the detected object remains in the detection region A or has passed through the detection region A and entered the space on the far side.

If a negative result is obtained in step 2, the processor 21C executes step 4 in the same way as Exemplary Embodiment 1.

If a positive result is obtained in step 2, the processor 21C determines whether or not an object has additionally passed through another detection region (step 41). In the case of the present exemplary embodiment, the other detection region refers to the detection region E or the detection region F (see FIGS. 19B and 19C).

If a negative result is obtained in step 41, the processor 21C executes step 3 in the same way as Exemplary Embodiment 1.

If a positive result is obtained in step 41, the processor 21C executes a process according to the sequential combination of content in the images presented in the surfaces that the object has passed through (step 42).

FIG. 21 is a diagram explaining a specific example of directing a process according to Exemplary Embodiment 4. In this example and the following example in FIG. 22, the process to direct is determined according to two detection regions entered by the fingertip. More specifically, the process target is determined by one of the two detection regions, and the process content is determined by the other of the two detection regions. In the examples of FIGS. 21 and 22, the process target is determined by the detection region that the fingertip initially passes through and the process content is determined by the detection region that the fingertip subsequently passes through, but the process content may be determined by the detection region that the fingertip initially passes through and the process target may be determined by the detection region that the fingertip subsequently passes through.

A process target called Document A is assigned to the detection region A corresponding to the surface on the front side of the floating solid image illustrated in FIG. 21, while process content called Email to Myself is assigned to the detection region E corresponding to the surface on the top side, and process content called Print is assigned to the detection region F corresponding to the surface on the right side from the perspective of the user. In addition, the text "Document A", "Email to Myself", and "Print" indicating the process target and the process content respectively assigned to the corresponding detection regions is presented on each surface of the floating image. Note that information such as an icon or a preview may also be used instead of text to indicate the process target or the process content.

In the example of FIG. 21, after the fingertip passes through the detection region A corresponding to Document A, the forward direction of the fingertip changes upward, the fingertip passes through the detection region E corresponding to the surface corresponding to the process called Email to Myself, and the fingertip exits to the outside of the floating solid image.

In the case of this example, the processor 21C sends the Document A as an email addressed to the user him- or herself. Note that the processor 21 has authenticated the user in advance using established authentication technology or the like.

To handle situations in which the user wants to select a document other than Document A as the process target, the user may be able to slide a finger across the first surface indicating "Document A" to thereby switch the process target to another document, for example. To indicate to the user the process content or the process target assigned to a detection region, in the case where the process content or the process target is changed, it may be beneficial to also update the information presented on each surface of the floating solid image (herein, the text such as "Document A" and "Print"). For example, in the case where the fingertip passes through the detection region E after passing through the detection region A in the state in which the first surface is indicating "Document B", Document B is emailed to the user. Note that it is also possible to make the process content changeable in a similar way.

FIG. 22 is a diagram explaining another specific example of directing a process according to Exemplary Embodiment 4. In FIG. 22, portions that correspond to FIG. 21 are denoted with the same signs.

In the case of FIG. 22, after the fingertip passes through the detection region A corresponding to Document A and moves to the far side of the detection region A, the fingertip changes direction to the right, and the fingertip passes through the detection region F corresponding to Print and exits to the outside of the floating solid image.

In the case of this example, the processor 21C instructs a predetermined printer to print Document A.

Exemplary Modification 1

In the case of the flowchart illustrated in FIG. 20, in step 41, the position inside the region where the object passes through is not distinguished, but by distinguishing the position inside the region where the object passes through, an increase in the number of combinations that may be indicated is anticipated.

Figure 23:
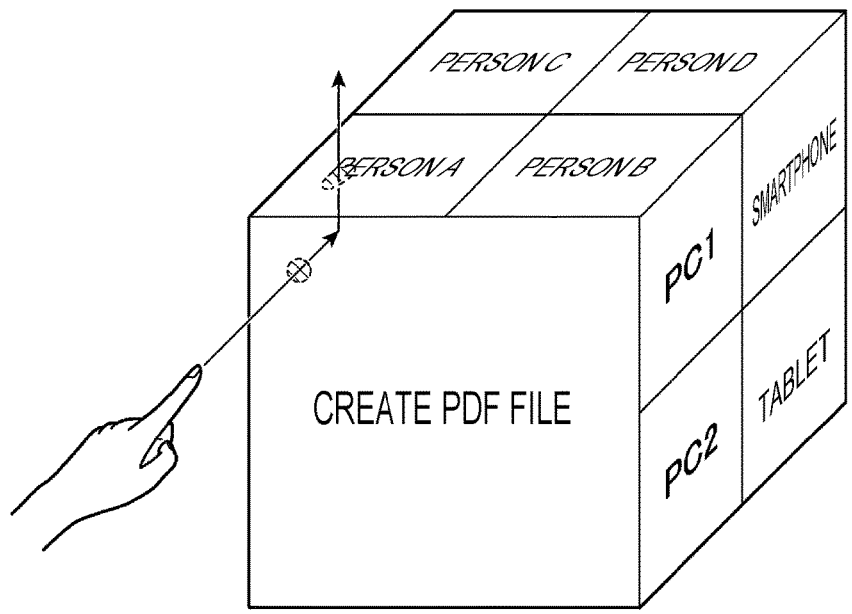
FIG. 23 is a diagram explaining another specific example of directing a process according to Exemplary Embodiment 4.

FIG. 23 is a diagram explaining another specific example of directing a process according to Exemplary Embodiment 4. In FIG. 23, portions that correspond to FIG. 21 are denoted with the same signs.

FIG. 23 illustrates a state in which the file to treat as the process target has already been selected. The selection of a file may be performed by a gesture in midair, or by performing an operation with a device not illustrated, such as an operation performed on a touch panel or an operation performed using a mouse or a trackpad.

In the example illustrated in FIG. 23, the surfaces of the floating solid image are taken to be the same as the detection regions for simplicity, but like the examples described earlier, the detection regions may also be given a thickness.

In the floating solid image illustrated in FIG. 23, a function of creating a PDF file is assigned to the surface on the front side, a function of sending an email is assigned to the surface on the top side, and a function of selecting a storage location is assigned to the surface on the right side from the perspective of the user.

In the case of FIG. 23, the surface on the top side and the surface on the right side are divided into four sub-regions each. The names of persons A, B, C, and D are assigned to the four sub-regions of the surface on the top side as options for selecting the email destination. Also, PC1, PC2, smartphone, and tablet are assigned to the four sub-regions of the surface on the right side as options for selecting the storage location.

In the case of FIG. 23, after the fingertip passes through the surface on the front side of the floating solid image, the forward direction of the fingertip changes upward, the fingertip passes through the sub-region corresponding to the person A of the surface on the top side, and the fingertip exists to the space on the outside.

In the case of this example, the processor 21C creates a PDF file from the preselected file, and sends the created PDF file as an email addressed to the person A.

FIG. 24 is a diagram explaining another specific example of directing a process according to Exemplary Embodiment 4. In FIG. 24, portions that correspond to FIG. 23 are denoted with the same signs. In the example illustrated in FIG. 24, the surfaces of the floating image are also taken to be the same as the detection regions for simplicity.

In the case of FIG. 24, after the fingertip passes through the front surface of the floating solid image, the fingertip changes direction to the right, passes through the sub-region corresponding to PC1 of the surface on the right side, and exits to the space on the outside.

In the case of this example, the processor 21C creates a PDF file from the preselected file, and stores the created PDF file in PC1.

The examples of FIGS. 23 and 24 illustrate a case of directing a series of processes in which the result obtained by performing a process determined by the detection region that the fingertip initially passes through is subjected to a process determined by the detection region that the fingertip subsequently passes through.

Note that in the examples of FIGS. 23 and 24, the fingertip passes through the region of each surface, but in cases where a document is selectable by grabbing an icon or the like of the document presented in midair as a floating image, it is also possible to cause the grabbed icon or the like of the document to pass through each surface.

Note that although the above description describes an example in which multiple sub-regions are not set on the front surface that the fingertip initially passes through, multiple sub-regions may also be provided on the front surface that the fingertip initially passes through.

Also, to handle situations in which the user wants to select a process other than creating a PDF as the first process content of the series of process, the user may be able to slide a finger across the first surface with the text "Create PDF File" to thereby switch the process content assigned to the first surface to other process content, for example.

Furthermore, the process content assigned to the detection region corresponding another surface may also be changed in accordance with the changed process content. For example, in the case where the process assigned to the detection region corresponding to the first surface is changed from a process of creating a PDF file to a process of uploading to Dropbox, the process content assigned to the detection region corresponding to another surface is changed to a process such as emailing a link to the upload destination, for example.

To indicate to the user the process content assigned to a detection region, in the case where the process content is changed, it may be beneficial to also update the information presented on each surface of the floating solid image (such as "Create PDF File", "PC1", and "PC2" in FIGS. 23 and 24).

Exemplary Modification 2

The case of Exemplary Modification 1 described above describes a case in which the file to treated as the process target has already been selected, but file selection may also be performed inside the floating solid image after the fingertip passes through one of the sub-regions on the surface in front.

Figure 25:
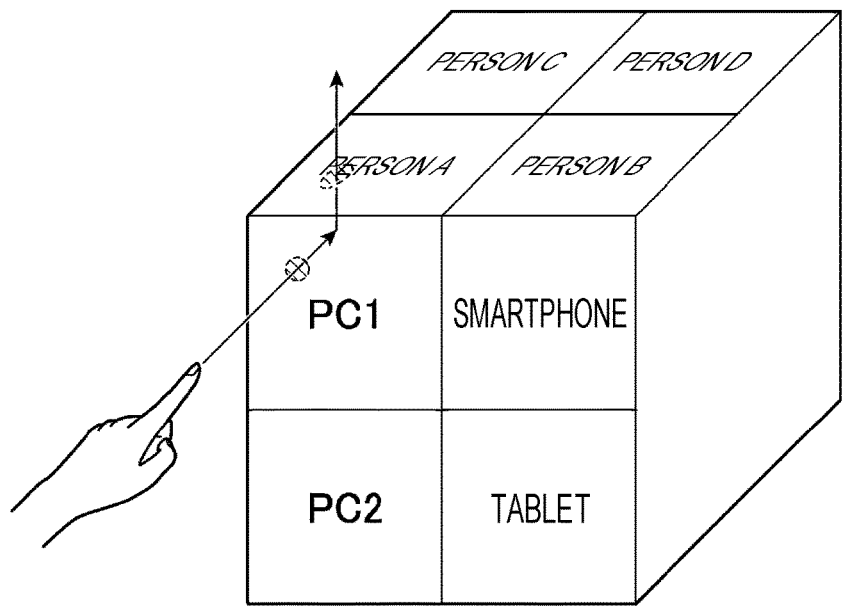
FIG. 25 is a diagram explaining another specific example of directing a process according to Exemplary Embodiment 4.

FIG. 25 is a diagram explaining another specific example of directing a process according to Exemplary Embodiment 4. In FIG. 24, portions that correspond to FIG. 24 are denoted with the same signs. In the example illustrated in FIG. 25, the surfaces of the floating image are also taken to be the same as the detection regions for simplicity.

In the case of the floating solid image illustrated in FIG. 25, a function of accessing a storage location is assigned to the surface on the front side, and a function of sending an email is assigned to the surface on the top side.

In the case of FIG. 25, the surface on the front side and the surface on the top side are divided into four sub-regions each. PC1, PC2, smartphone, and tablet as assigned to the four sub-regions of the surface on the front side. Also, the names of persons A, B, C, and D are assigned to the four sub-regions of the surface on the top side.

In the case of FIG. 25, the fingertip is passing through PC1 from among the four sub-regions provided on the front surface of the floating solid image. In the case of this example, in response to the fingertip passing through PC1, a panel that uses icons to hierarchically illustrate folders and files stored in the storage location of PC1 is presented inside the floating solid image as the floating image #2. To present the floating image #2, the technology of step 11 (see FIG. 9) in Exemplary Embodiment 2 is used.

Figure 26:
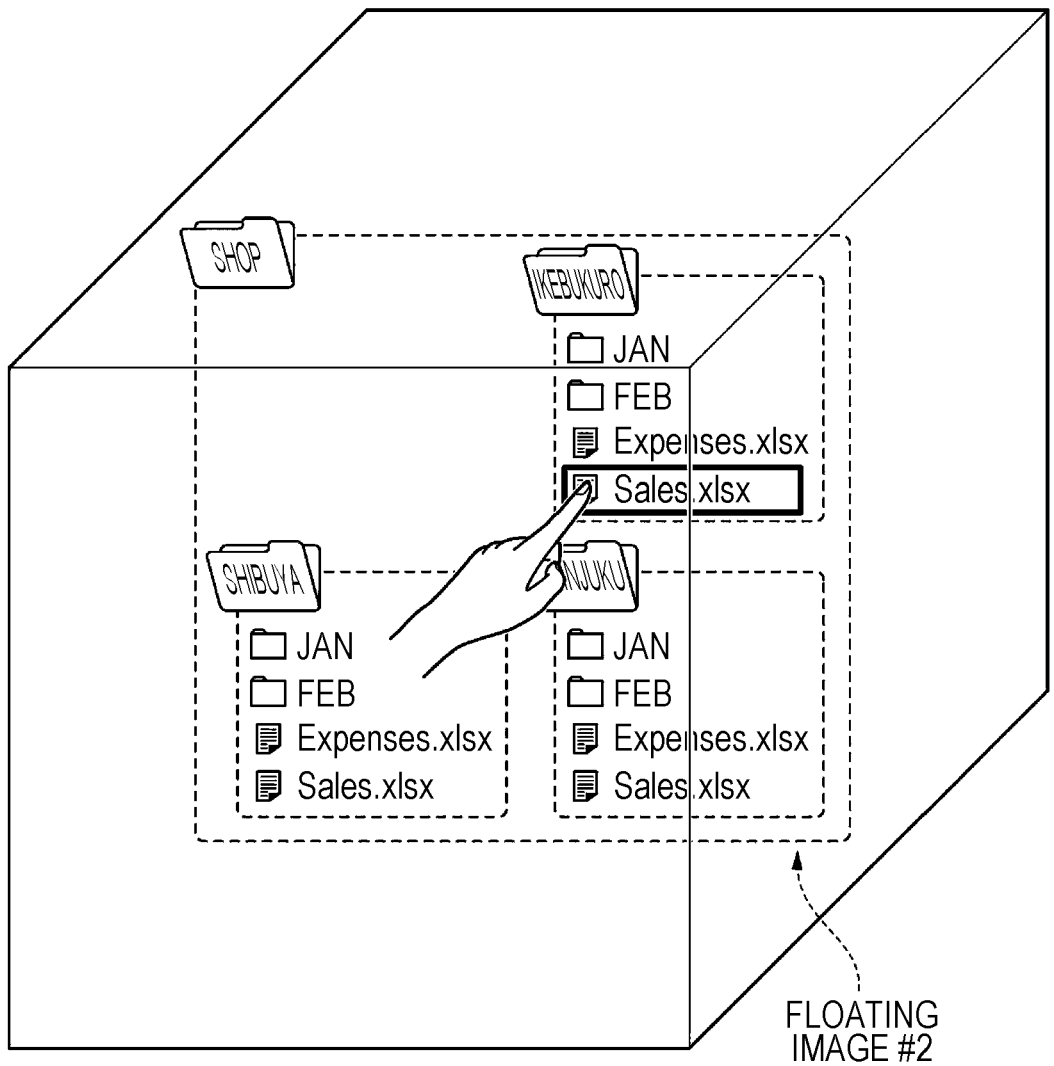
FIG. 26 is a diagram illustrating a state in which a floating image #2 is newly presented inside a floating solid image.

FIG. 26 is a diagram illustrating a state in which the floating image #2 is newly presented inside the floating solid image. In FIG. 26, the information (herein, text such as "PC1, "PC2", "smartphone", and "tablet") and dividing lines that had been presented on the floating image displayed before the fingertip passed through the surface on the front side of the floating image #1 that the fingertip initially passed through disappear to make the floating image #2 more visible.

In the floating image #2 illustrated in FIG. 26, four folders inside PC1 are presented, namely a Shop folder, a Shibuya folder, an Ikebukuro folder, and a Shinjuku folder. Also, as the diagram illustrates, the Ikebukuro folder contains two subfolders, an expenses file, and a sales file.

In the example of FIG. 26, the sales file is surrounded by a thick line to indicate that the sales file has been selected. The selection of a file may be performed by a gesture in midair (such as by moving the fingertip to pass through the region where the sales file is being displayed, for example), or by performing an operation with a device not illustrated, such as an operation performed on a touch panel or an operation performed using a mouse or a trackpad.

FIG. 27 is a diagram explaining the motion of the fingertip after a file is selected. In FIG. 27, portions that correspond to FIG. 26 are denoted with the same signs.

In the case of FIG. 27, the fingertip passes through the sub-region corresponding to the person B and moves to the outside of the floating solid image.

In response to this gesture, the processor 21C sends the sales file in the Ikebukuro folder stored in PC1 as an email addressed to the person B.

In the example of FIG. 27, the floating image #2 indicating folders and files that is presented inside the floating solid image disappears after selecting the file to send by email, but the floating image #2 indicating folders and files may also be maintained. Also, for example, the floating image #1 indicating storage locations may be represented on the surface in front after a file is selected.

Other Exemplary Embodiments

The foregoing describes exemplary embodiments of the present disclosure, but the technical scope of the present disclosure is not limited to the scope described in the foregoing exemplary embodiments. It is clear from the claims that a variety of modifications or alterations to the foregoing exemplary embodiments are also included in the technical scope of the present disclosure.

For example, in Exemplary Embodiment 2 described above, the user is notified of the selection of a floating image or the selection of a sub-region in a floating image by acoustic radiation pressure, but the user may also be notified by changing the appearance of the floating image.

Figure 28:
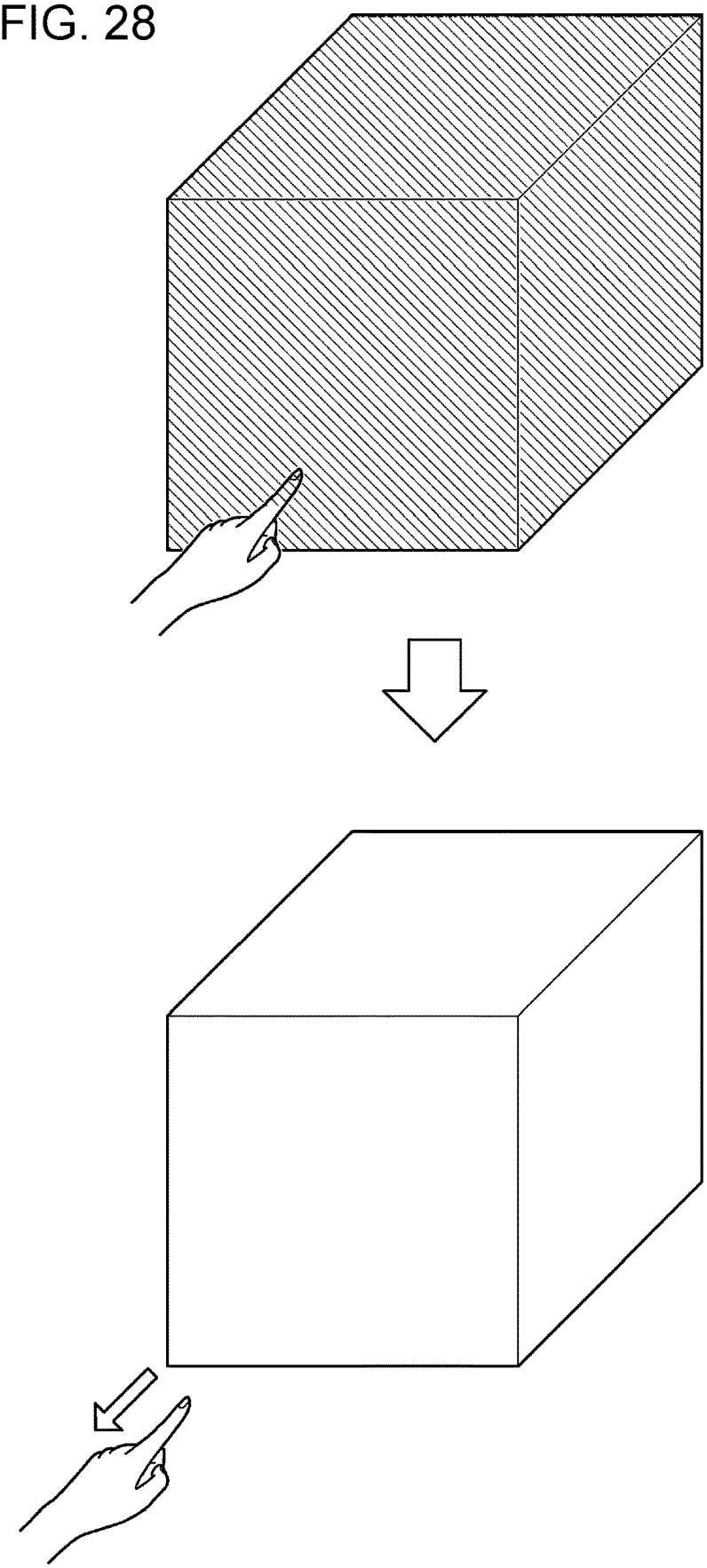
FIG. 28 is a diagram explaining a change in the appearance of the floating image #1 in association with receiving a selection.

FIG. 28 is a diagram explaining a change in the appearance of a floating solid image in association with receiving a selection. In the case of FIG. 28, a change of color is conditional on the fingertip exiting to the outside of the floating solid image. This example is an example in which the appearance of the floating solid image changes in response to exiting the first region. Note that the change of appearance is not limited to color, and may also be a change of shape. Obviously, the change of appearance is also applicable to the case of a flat floating image.

Figure 29:
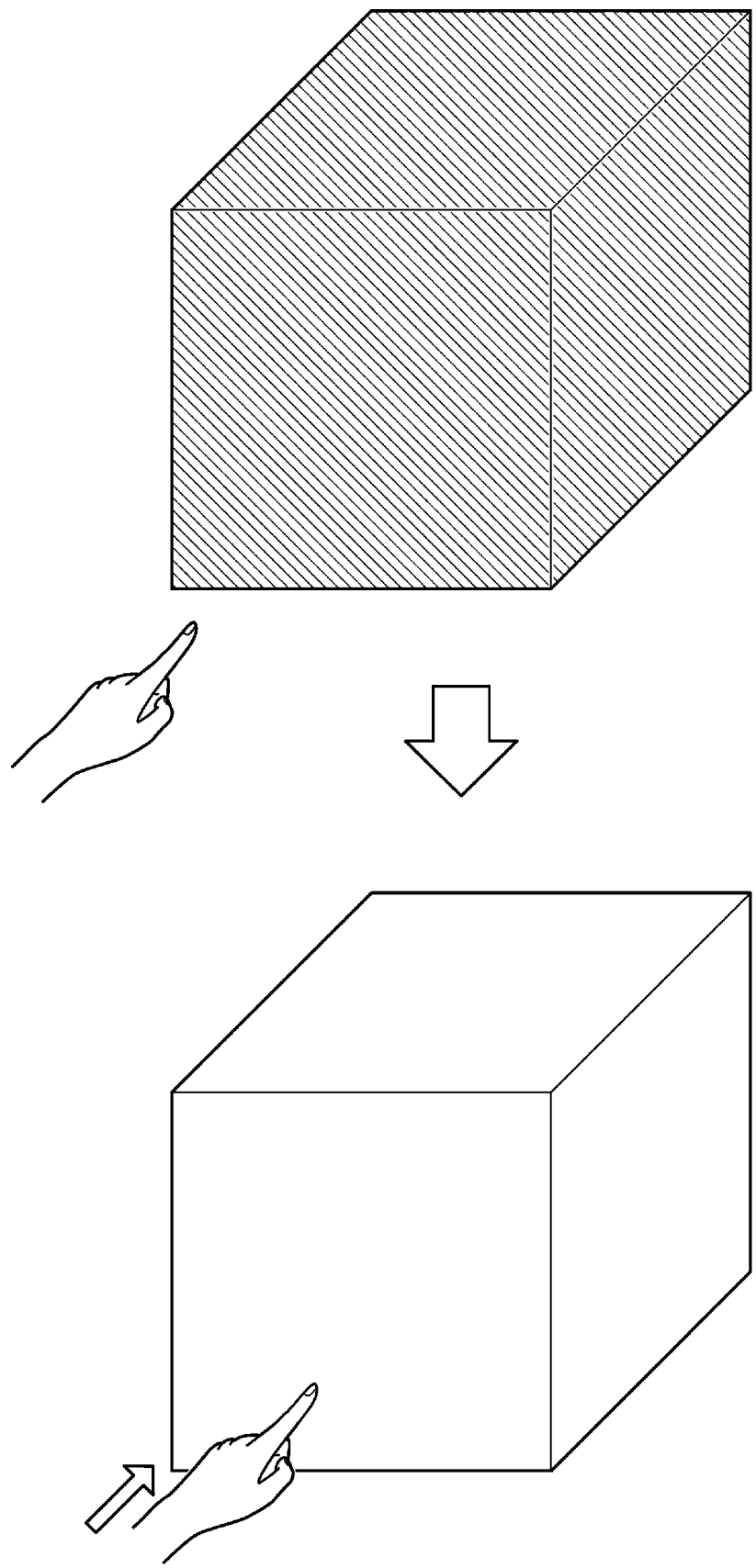
FIG. 29 is a diagram explaining another change in the appearance of the floating image #1 in association with receiving a selection.

FIG. 29 is a diagram explaining another change in the appearance of a floating image in association with receiving a selection. In the case of FIG. 29, a change of color is conditional on the fingertip passing through the surface of the floating solid image to the far side. This example is an example in which the appearance of the floating solid image changes in response to entering the first region.

Note that the changes of appearance illustrated in FIGS. 28 and 29 are also applicable to the detection of entering or exiting the second region.

In the case of the foregoing exemplary embodiments, the relationship between an object such as a fingertip and the position of a floating image or the relationship of the object and the position of a sub-region is detected on the basis of whether the object that has entered a detection region corresponding to the sensor 30 from the space on the near side of the detection region is in the detection region or has passed through the detection region and entered the space on the far side of the detection region. However, the position of the object with respect to the floating image may also be detected by receiving a radio wave or the like emitted from an object acting as the detection target.

Figure 30:
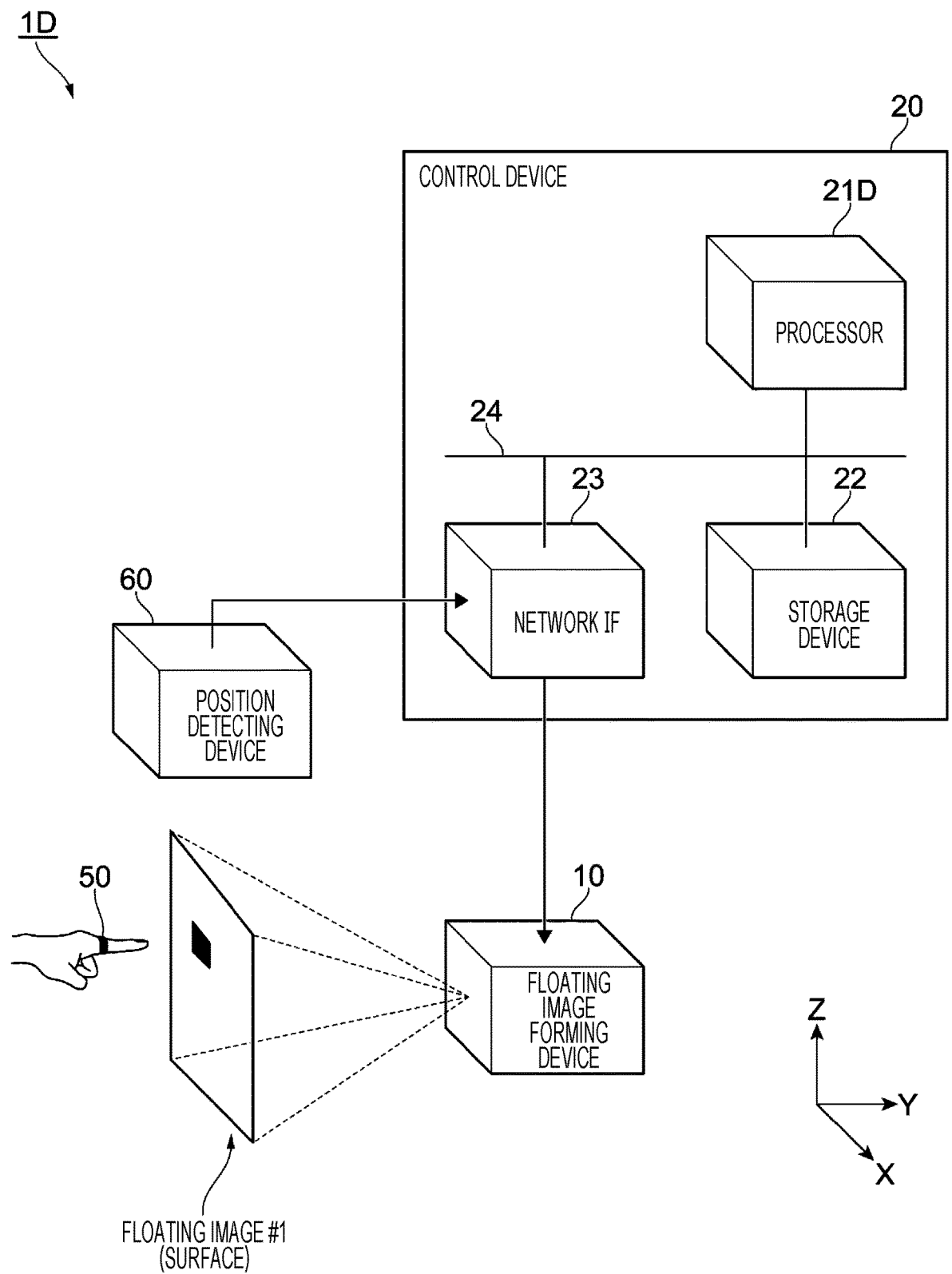
FIG. 30 is a diagram explaining an information processing system including a position detecting device that detects the position of a ring that transmits a Bluetooth (registered trademark) signal.

FIG. 30 is a diagram explaining an information processing system 1D including a position detecting device 60 that detects the position of a ring 50 that transmits a Bluetooth signal. The position detecting device 60 in FIG. 30 uses the principle of triangulation to detect the ring 50 that transmits the Bluetooth signal. A processor 21D may use position information about the ring 50 detected by the position detecting device 60 to determine whether a gesture performed by the user is a "touch" or a "deep touch", and execute a process according to the determination result.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
   a processor configured to
      perform a first process in response to detection of a first movement of a tangible object in a real world, the first movement comprising a first pass-through of a first region from a first space to a second space, the first region corresponding to a first image presented in midair to a user, the first region having a predetermined depth in a direction perpendicular to the first image, the first space being a space on one side of the first region, the second space being a space on an opposite side of the first region, and
      perform a second process in response to detection of a second movement of the object, the second movement comprising an entrance to the first region from the first space but not comprising an exit to the second space from the first region, the second process being different from the first process,
   wherein the second process is a process that presents a second image in midair in the first space.

2. The information processing device according to claim 1, wherein the first process is a process that presents a second image in midair in the second space.

3. The information processing device according to claim 2, wherein the processor is configured to perform a third process in response to selection of the second image by the user.

4. The information processing device according to claim 1, wherein
   the first movement further comprises a second pass-through of the first region from the second space to the first space, and
   the first process varies depending on a sub-region of the first region that the object passes through at the second pass-through.

5. The information processing device according to claim 1, wherein
   the first movement further comprises a second pass-through of the first region from the second space to the first space, and
   the first process varies depending on a combination of a first sub-region of a plurality of sub-regions that the object passes through at the first pass-through and a second sub-region of the plurality of sub-regions that the object passes through at the second pass-through.

6. The information processing device according to claim 1, wherein
   the processor is configured to instruct a stimulator to provide a stimulus to the object in response to the first pass-through of the object.

7. The information processing device according to claim 1, wherein
   the processor is configured to assign a specific function to the first region according to a selection by a user.

8. An information processing device comprising:
   a processor configured to perform a first process in response to a first movement of a tangible object in a real world, the first movement comprising a pass-through of a first region from a first space to a second space and a pass-through of a second region, the first region corresponding to a first portion of a three-dimensional image presented in midair to a user, the first region having a predetermined depth in a direction perpendicular to the three-dimensional image, the first space being a space on one side of the first region, the second space being a space on an opposite side of the first region, the second region corresponding to a second portion of the three-dimensional image, the first process being determined by content corresponding to the first region and content corresponding to the second region,
   present a second image in midair in the second space in response to the object being detected at a predetermined position in the first region, and
   perform a second process in response to detection of the pass-through of the second region with the second image being selected, the second process being determined by content corresponding to the first region, content corresponding to the second region, and content corresponding to the second image, the second process being different from the first process.

9. The information processing device according to claim 8, wherein
   the second region includes a plurality of sub-regions, and
   the first process is determined by content corresponding to the first region and content corresponding to a sub-region of the second region that the object passes through at the pass-through of the second region.

10. The information processing device according to claim 9, wherein
    the first region corresponds to a function, and
    the plurality of sub-regions of the second region correspond to different settings of the function.

11. The information processing device according to claim 8, wherein
    the first region includes a plurality of sub-regions, and
    the first process is determined by content corresponding to a sub-region of the first region that the object passes through at the pass-through of the first region, and content corresponding to the second region.

12. The information processing device according to claim 8, wherein
    the first region and the second region each include a plurality of sub-regions, and
    the first process is determined by content corresponding to a sub-region of the first region that the object passes through at the pass-through of the first region in a part of the first region and content corresponding to a sub-region of the second region that the object passes through at the pass-through of the second region.

13. The information processing device according to claim 8, wherein
    the first three-dimensional image is a polyhedron with a first face and a second face, and
    the first portion is the first face and the second portion is the second face.

14. The information processing device according to claim 8, wherein
the processor is configured to change an appearance of the three-dimensional image as the object passes through the first region.

15. The information processing device according to claim 8, wherein
the processor is configured to change an appearance of the three-dimensional image as the object passes through the second region.

16. A non-transitory computer readable medium storing a program causing a computer to execute a process for processing information, the process comprising:
performing a first process in response to detection of a first movement of a tangible object in a real world, the first movement comprising a first pass-through of a first region from a first space to a second space, the first region corresponding to a first image presented in midair to a user, the first region having a predetermined depth in a direction perpendicular to the first image, the first space being a space on one side of the first region, the second space being a space on an opposite side of the first region, and
performing a second process in response to detection of a second movement of the object, the second movement comprising an entrance to the first region from the first space but not comprising an exit to the second space from the first region, the second process being different from the first process,
wherein the second process is a process that presents a second image in midair in the first space.

17. A non-transitory computer readable medium storing a program causing a computer to execute a process for processing information, the process comprising:
performing a first process in response to detection of a first movement of a tangible object in a real world, the first movement comprising a first pass-through of a first region from a first space to a second space, the first region corresponding to a first image presented in midair to a user, the first region having a predetermined depth in a direction perpendicular to the first image, the first space being a space on one side of the first region, the second space being a space on an opposite side of the first region, and
performing a second process in response to detection of a second movement of the object, the second movement comprising an entrance to the first region from the first space but not comprising an exit to the second space from the first region, the second process being different from the first process.

* * * * *